United States Patent
Smith et al.

(10) Patent No.: US 7,916,626 B2
(45) Date of Patent: Mar. 29, 2011

(54) METHOD AND SYSTEM FOR FAULT-TOLERANT QUALITY OF SERVICE

(75) Inventors: Donald L. Smith, Satellite Beach, FL (US); Anthony P. Galluscio, Indialantic, FL (US); Robert J. Knazik, Cocoa Beach, FL (US)

(73) Assignee: Harris Corporation, Melbourne, FL (US)

( * ) Notice: Subject to any disclaimer, the term of this patent is extended or adjusted under 35 U.S.C. 154(b) by 1003 days.

(21) Appl. No.: 11/425,021

(22) Filed: Jun. 19, 2006

(65) Prior Publication Data
US 2007/0291647 A1 Dec. 20, 2007

(51) Int. Cl.
*H04L 12/28* (2006.01)

(52) U.S. Cl. .......... 370/216; 370/237; 370/395.21; 370/395.42; 370/412

(58) Field of Classification Search .......... None
See application file for complete search history.

(56) References Cited

U.S. PATENT DOCUMENTS

| | | | |
|---|---|---|---|
| 5,241,632 A | 8/1993 | O'Connell et al. | 710/117 |
| 5,559,999 A | 9/1996 | Maturi et al. | |
| 5,560,038 A | 9/1996 | Haddock | |
| 5,627,970 A | 5/1997 | Keshav | |
| 5,664,091 A | 9/1997 | Keen | |
| 5,671,224 A | 9/1997 | Pyhalammi et al. | |
| 5,748,739 A | 5/1998 | Press | 713/164 |
| 5,761,445 A | 6/1998 | Nguyen | 710/100 |
| 5,784,566 A | 7/1998 | Viavant et al. | 709/229 |
| 5,844,600 A | 12/1998 | Kerr | |
| 5,949,758 A | 9/1999 | Kober | |
| 5,960,035 A | 9/1999 | Sridhar et al. | |
| 6,028,843 A | 2/2000 | Delp et al. | |
| 6,044,419 A | 3/2000 | Hayek et al. | |
| 6,067,557 A | 5/2000 | Hedge | |
| 6,072,781 A | 6/2000 | Feeney et al. | |
| 6,075,770 A | 6/2000 | Chang et al. | |

(Continued)

FOREIGN PATENT DOCUMENTS
EP 0853404 7/1998

(Continued)

OTHER PUBLICATIONS

Bakre A. V. et al: "Implementation and Performance Evaluation of Indirect TCP" IEEE Transactions on Computers, vol. 46, No. 3, Mar. 1997.

(Continued)

*Primary Examiner* — Chi H. Pham
*Assistant Examiner* — Shick Hom
(74) *Attorney, Agent, or Firm* — McAndrews, Held & Malloy, Ltd.

(57) ABSTRACT

Certain embodiments of the present invention provide for a system and method for fault-tolerant QoS data communication including differentiating one or more message data into a primary storage, storing the differentiated one or more message data in a secondary storage if the primary storage becomes exhausted, prioritizing the one or more message data, and communicating the one or more message data. The one or more message data may be differentiated based on one or more queue selection rules. The one or more message data may be prioritized based on one or more queue sequencing rules. The one or more message data may be communicated based at least in part on the prioritization of the one or more message data.

16 Claims, 5 Drawing Sheets

U.S. PATENT DOCUMENTS

| | | | |
|---|---|---|---|
| 6,124,806 A | 9/2000 | Cunningham et al. | |
| 6,154,778 A | 11/2000 | Koistinen et al. | |
| 6,170,075 B1 | 1/2001 | Schuster et al. | |
| 6,205,486 B1 | 3/2001 | Wei et al. | |
| 6,233,248 B1 | 5/2001 | Sautter et al. | |
| 6,236,656 B1 | 5/2001 | Westerberg et al. | |
| 6,247,058 B1 | 6/2001 | Miller et al. | |
| 6,273,622 B1 * | 8/2001 | Ben-David | 709/230 |
| 6,279,035 B1 | 8/2001 | Brown et al. | |
| 6,301,527 B1 | 10/2001 | Butland et al. | |
| 6,314,425 B1 * | 11/2001 | Serbinis et al. | 707/10 |
| 6,332,163 B1 | 12/2001 | Bowman-Amuah | |
| 6,343,085 B1 | 1/2002 | Krishnan et al. | |
| 6,343,318 B1 | 1/2002 | Hawkins et al. | |
| 6,363,411 B1 | 3/2002 | Dugan et al. | |
| 6,397,259 B1 | 5/2002 | Lincke et al. | |
| 6,401,117 B1 | 6/2002 | Narad et al. | |
| 6,404,776 B1 | 6/2002 | Voois et al. | |
| 6,407,998 B1 | 6/2002 | Polit et al. | |
| 6,408,341 B1 | 6/2002 | Feeney et al. | |
| 6,421,335 B1 | 7/2002 | Kilkki et al. | |
| 6,438,603 B1 | 8/2002 | Ogus | |
| 6,490,249 B1 | 12/2002 | Aboul-Magd et al. | |
| 6,498,782 B1 | 12/2002 | Branstad et al. | |
| 6,507,864 B1 | 1/2003 | Klein et al. | |
| 6,532,465 B2 | 3/2003 | Hartley et al. | |
| 6,542,593 B1 | 4/2003 | Bowman-Amuah | |
| 6,556,982 B1 | 4/2003 | McGaffey et al. | |
| 6,557,053 B1 | 4/2003 | Bass et al. | |
| 6,560,592 B1 | 5/2003 | Reid et al. | |
| 6,563,517 B1 | 5/2003 | Bhagwat et al. | |
| 6,587,435 B1 | 7/2003 | Miyake et al. | |
| 6,587,875 B1 | 7/2003 | Ogus | |
| 6,590,588 B2 | 7/2003 | Lincke et al. | |
| 6,598,034 B1 | 7/2003 | Kloth | |
| 6,600,744 B1 | 7/2003 | Carr et al. | |
| 6,611,522 B1 | 8/2003 | Zheng et al. | |
| 6,614,781 B1 | 9/2003 | Elliott et al. | |
| 6,618,385 B1 | 9/2003 | Cousins | |
| 6,625,650 B2 | 9/2003 | Stelliga | |
| 6,633,835 B1 | 10/2003 | Moran et al. | |
| 6,640,184 B1 | 10/2003 | Rabe | |
| 6,640,248 B1 | 10/2003 | Jorgensen | |
| 6,650,902 B1 | 11/2003 | Richton | |
| 6,668,175 B1 | 12/2003 | Almgren et al. | |
| 6,671,589 B2 | 12/2003 | Holst et al. | |
| 6,671,732 B1 | 12/2003 | Weiner | |
| 6,680,922 B1 | 1/2004 | Jorgensen | |
| 6,687,735 B1 | 2/2004 | Logston et al. | |
| 6,691,168 B1 | 2/2004 | Bal et al. | |
| 6,700,871 B1 | 3/2004 | Harper et al. | |
| 6,715,145 B1 | 3/2004 | Bowman-Amuah | |
| 6,728,749 B1 | 4/2004 | Richardson | |
| 6,732,228 B1 | 5/2004 | Willardson | |
| 6,741,562 B1 | 5/2004 | Keirouz et al. | |
| 6,748,070 B2 | 6/2004 | Kalmanek, Jr. et al. | |
| 6,760,309 B1 | 7/2004 | Rochberger et al. | |
| 6,771,609 B1 | 8/2004 | Gudat et al. | |
| 6,772,223 B1 | 8/2004 | Corl et al. | |
| 6,778,530 B1 | 8/2004 | Greene | |
| 6,778,546 B1 | 8/2004 | Epps et al. | |
| 6,798,776 B1 | 9/2004 | Cheriton et al. | |
| 6,819,655 B1 | 11/2004 | Gregson | |
| 6,819,681 B1 | 11/2004 | Hariharasubrahmanian | |
| 6,820,117 B1 | 11/2004 | Johnson | |
| 6,822,940 B1 | 11/2004 | Zavalkovsky et al. | |
| 6,826,627 B2 | 11/2004 | Sjollema et al. | |
| 6,832,118 B1 | 12/2004 | Heberlein et al. | |
| 6,832,239 B1 | 12/2004 | Kraft et al. | |
| 6,839,731 B2 | 1/2005 | Alexander et al. | |
| 6,839,768 B2 | 1/2005 | Ma et al. | |
| 6,845,100 B1 | 1/2005 | Rinne | |
| 6,850,486 B2 | 2/2005 | Saleh et al. | |
| 6,854,009 B1 | 2/2005 | Hughes | |
| 6,854,069 B2 | 2/2005 | Kampe et al. | |
| 6,862,265 B1 | 3/2005 | Appala et al. | |
| 6,862,622 B2 | 3/2005 | Jorgensen | |
| 6,865,153 B1 | 3/2005 | Hiel et al. | |
| 6,870,812 B1 | 3/2005 | Kloth et al. | |
| 6,873,600 B1 | 3/2005 | Duffield et al. | |
| 6,879,590 B2 | 4/2005 | Pedersen et al. | |
| 6,882,642 B1 | 4/2005 | Kejriwal et al. | |
| 6,885,643 B1 | 4/2005 | Teramoto et al. | |
| 6,888,806 B1 | 5/2005 | Miller et al. | |
| 6,888,807 B2 | 5/2005 | Heller et al. | |
| 6,891,839 B2 | 5/2005 | Albert et al. | |
| 6,891,842 B2 | 5/2005 | Sahaya et al. | |
| 6,891,854 B2 | 5/2005 | Zhang et al. | |
| 6,892,309 B2 | 5/2005 | Richmond et al. | |
| 6,901,484 B2 | 5/2005 | Doyle et al. | |
| 6,904,054 B1 | 6/2005 | Baum et al. | |
| 6,904,058 B2 | 6/2005 | He et al. | |
| 6,907,243 B1 | 6/2005 | Patel | |
| 6,907,462 B1 | 6/2005 | Li et al. | |
| 6,910,074 B1 | 6/2005 | Amin et al. | |
| 6,912,221 B1 | 6/2005 | Zadikian et al. | |
| 6,914,882 B2 | 7/2005 | Merani et al. | |
| 6,917,622 B2 | 7/2005 | McKinnon, III et al. | |
| 6,920,145 B2 | 7/2005 | Matsuoka et al. | |
| 6,922,724 B1 | 7/2005 | Freeman et al. | |
| 6,928,085 B2 | 8/2005 | Haartsen | |
| 6,928,471 B2 | 8/2005 | Pabari et al. | |
| 6,934,250 B1 | 8/2005 | Kejriwal et al. | |
| 6,934,752 B1 | 8/2005 | Gubbi | |
| 6,934,795 B2 | 8/2005 | Nataraj et al. | |
| 6,937,154 B2 | 8/2005 | Zeps et al. | |
| 6,937,561 B2 | 8/2005 | Chiussi et al. | |
| 6,937,566 B1 | 8/2005 | Forslow | |
| 6,937,591 B2 | 8/2005 | Guo et al. | |
| 6,940,808 B1 | 9/2005 | Shields et al. | |
| 6,940,813 B2 | 9/2005 | Ruutu et al. | |
| 6,940,832 B2 | 9/2005 | Saadawi et al. | |
| 6,941,341 B2 | 9/2005 | Logston et al. | |
| 6,944,168 B2 | 9/2005 | Paatela et al. | |
| 6,947,378 B2 | 9/2005 | Wu et al. | |
| 6,947,943 B2 | 9/2005 | DeAnna et al. | |
| 6,947,996 B2 | 9/2005 | Assa et al. | |
| 6,950,400 B1 | 9/2005 | Tran et al. | |
| 6,950,441 B1 | 9/2005 | Kaczmarczyk et al. | |
| 6,952,401 B1 | 10/2005 | Kadambi et al. | |
| 6,952,416 B1 | 10/2005 | Christie, IV | |
| 6,975,647 B1 | 12/2005 | Neale et al. | |
| 7,023,851 B2 | 4/2006 | Chakravorty | |
| 7,065,084 B2 | 6/2006 | Seo | 370/392 |
| 7,095,715 B2 | 8/2006 | Buckman et al. | |
| 7,149,898 B2 | 12/2006 | Marejka et al. | |
| 7,200,144 B2 | 4/2007 | Terrell et al. | |
| 7,251,242 B2 * | 7/2007 | Schrodi | 370/352 |
| 7,260,102 B2 | 8/2007 | Mehrvar et al. | |
| 7,289,498 B2 | 10/2007 | Yu et al. | |
| 7,330,908 B2 | 2/2008 | Jungck | |
| 7,337,236 B2 | 2/2008 | Bess et al. | |
| 7,349,422 B2 | 3/2008 | Duong et al. | |
| 7,359,321 B1 | 4/2008 | Sindhu et al. | |
| 7,376,829 B2 | 5/2008 | Ranjan | |
| 7,408,932 B2 | 8/2008 | Kounavis et al. | |
| 7,424,579 B2 | 9/2008 | Wheeler et al. | |
| 7,433,307 B2 | 10/2008 | Hooper et al. | |
| 7,434,221 B2 | 10/2008 | Hooper et al. | |
| 7,471,689 B1 | 12/2008 | Tripathi et al. | |
| 7,477,651 B2 | 1/2009 | Schmidt et al. | |
| 7,489,666 B2 | 2/2009 | Koo et al. | |
| 7,499,457 B1 | 3/2009 | Droux et al. | |
| 7,543,072 B1 | 6/2009 | Hertzog et al. | |
| 7,590,756 B2 | 9/2009 | Chan | |
| 2001/0030970 A1 | 10/2001 | Wiryaman et al. | |
| 2002/0009060 A1 | 1/2002 | Gross | |
| 2002/0009081 A1 | 1/2002 | Sampath et al. | |
| 2002/0010792 A1 | 1/2002 | Border | |
| 2002/0062395 A1 | 5/2002 | Thompson et al. | |
| 2002/0091802 A1 | 7/2002 | Paul et al. | |
| 2002/0122387 A1 * | 9/2002 | Ni | 370/231 |
| 2002/0122395 A1 | 9/2002 | Bourlas et al. | |
| 2002/0141338 A1 | 10/2002 | Burke | |
| 2002/0143948 A1 | 10/2002 | Maher et al. | |
| 2002/0160805 A1 | 10/2002 | Laitinen et al. | |
| 2002/0188871 A1 * | 12/2002 | Noehring et al. | 713/201 |

| | | | | | | |
|---|---|---|---|---|---|---|
| 2002/0191253 | A1 | 12/2002 | Yang et al. | EP | 1648125 | 4/2006 |
| 2003/0004952 | A1 | 1/2003 | Nixon et al. | JP | 2004-222010 | 5/2004 |
| 2003/0016625 | A1 | 1/2003 | Narsinh et al. | KR | 2002-45703 | 6/2002 |
| 2003/0021291 | A1 | 1/2003 | White et al. | KR | 2004-71761 | 8/2004 |
| 2003/0033394 | A1 | 2/2003 | Stine | WO | WO0174027 | 10/2001 |
| 2003/0067877 | A1 | 4/2003 | Sivakumar | WO | 2002030066 | 4/2002 |
| 2003/0110286 | A1 | 6/2003 | Antal et al. | WO | WO0230066 A1 | 4/2002 |
| 2003/0112802 | A1 | 6/2003 | Ono et al. | WO | WO03053013 | 6/2003 |
| 2003/0112824 | A1 | 6/2003 | Acosta ............... 370/474 | WO | WO03/058466 | 7/2003 |
| 2003/0118107 | A1 | 6/2003 | Itakura et al. | WO | WO2004023323 | 3/2004 |
| 2003/0158963 | A1 | 8/2003 | Sturdy et al. | WO | WO2004036845 | 4/2004 |
| 2003/0189935 | A1 | 10/2003 | Warden et al. | WO | WO2005076539 | 8/2005 |
| 2003/0195983 | A1 | 10/2003 | Krause | WO | 200607115 | 7/2006 |
| 2003/0236828 | A1 | 12/2003 | Rock et al. | WO | WO2006071155 | 7/2006 |
| 2004/0001493 | A1 | 1/2004 | Cloonan et al. | WO | WO2006071155 A1 | 7/2006 |
| 2004/0038685 | A1 | 2/2004 | Nakabayashi | WO | 2007149165 | 2/2007 |
| 2004/0057437 | A1 | 3/2004 | Daniel et al. | WO | 2007149166 | 2/2007 |
| 2004/0076161 | A1 | 4/2004 | Lavian et al. | WO | 2007147032 | 12/2007 |
| 2004/0077345 | A1 | 4/2004 | Turner et al. | WO | 2007147040 | 12/2007 |
| 2004/0125815 | A1 | 7/2004 | Shimazu et al. | WO | 2007149769 | 12/2007 |
| 2004/0131014 | A1 | 7/2004 | Thompson et al. | WO | 2007149805 | 12/2007 |
| 2004/0165528 | A1 | 8/2004 | Li et al. | WO | WO2007147032 A1 | 12/2007 |
| 2004/0172476 | A1 | 9/2004 | Chapweske | WO | WO2007147040 A2 | 12/2007 |
| 2004/0174898 | A1 | 9/2004 | Kadambi et al. | WO | WO2007149769 A2 | 12/2007 |
| 2004/0190451 | A1* | 9/2004 | Dacosta ............... 370/230 | WO | WO2007149805 A2 | 12/2007 |
| 2004/0218532 | A1 | 11/2004 | Khirman | WO | 2008008865 | 1/2008 |
| 2004/0228363 | A1 | 11/2004 | Adamczyk et al. | WO | WO2008008865 A2 | 1/2008 |
| 2004/0252698 | A1 | 12/2004 | Anschutz et al. | WO | 2008016845 | 2/2008 |
| 2005/0030952 | A1 | 2/2005 | Elmasry | WO | 2008016846 | 2/2008 |
| 2005/0060427 | A1 | 3/2005 | Phillips et al. | WO | 2008016848 | 2/2008 |
| 2005/0078672 | A1 | 4/2005 | Caliskan et al. | WO | 2008016850 | 2/2008 |
| 2005/0114036 | A1 | 5/2005 | Fruhling et al. ............. 702/19 | WO | WO2008016845 A1 | 2/2008 |
| 2005/0169257 | A1 | 8/2005 | Lahetkangas et al. | WO | WO2008016846 A2 | 2/2008 |
| 2005/0171932 | A1 | 8/2005 | Nandhra | WO | WO2008016848 A2 | 2/2008 |
| 2005/0220115 | A1 | 10/2005 | Romano et al. | WO | WO2008016850 A2 | 2/2008 |
| 2005/0226233 | A1 | 10/2005 | Kryuchkov et al. | | | |
| 2005/0232153 | A1 | 10/2005 | Bishop et al. | | | |
| 2006/0036906 | A1 | 2/2006 | Luciani et al. | | | |
| 2006/0039404 | A1 | 2/2006 | Rao et al. | | | |
| 2006/0106753 | A1 | 5/2006 | Yoon et al. | | | |
| 2006/0109857 | A1 | 5/2006 | Herrmann | | | |
| 2006/0140121 | A1 | 6/2006 | Kakani et al. | | | |
| 2006/0165051 | A1 | 7/2006 | Banerjee et al. | | | |
| 2006/0215593 | A1 | 9/2006 | Wang et al. | | | |
| 2006/0286993 | A1 | 12/2006 | Xie et al. | | | |
| 2007/0058561 | A1 | 3/2007 | Virgile | | | |
| 2007/0060045 | A1* | 3/2007 | Prautzsch ............ 455/3.06 | | | |
| 2007/0070895 | A1 | 3/2007 | Narvaez ............... 370/230 | | | |
| 2007/0133582 | A1 | 6/2007 | Banerjee et al. | | | |
| 2007/0153798 | A1 | 7/2007 | Krstulich | | | |
| 2007/0156919 | A1 | 7/2007 | Potti et al. | | | |
| 2007/0171910 | A1 | 7/2007 | Kumar | | | |
| 2007/0189327 | A1* | 8/2007 | Konda ............... 370/466 | | | |
| 2007/0206506 | A1 | 9/2007 | Purpura | | | |
| 2007/0253412 | A1 | 11/2007 | Batteram et al. | | | |
| 2007/0263616 | A1 | 11/2007 | Castro et al. | | | |
| 2007/0275728 | A1 | 11/2007 | Lohr et al. | | | |
| 2007/0291656 | A1 | 12/2007 | Knazik et al. | | | |
| 2007/0291751 | A1 | 12/2007 | Smith et al. | | | |
| 2007/0291766 | A1 | 12/2007 | Knazik et al. | | | |
| 2008/0065808 | A1 | 3/2008 | Hoese et al. | | | |
| 2008/0144493 | A1* | 6/2008 | Yeh ............... 370/230 | | | |
| 2008/0293413 | A1 | 11/2008 | Sharif-Ahmadi et al. | | | |
| 2009/0046264 | A1* | 2/2009 | Pouls ............... 355/53 | | | |
| 2009/0161741 | A1 | 6/2009 | Ginis et al. | | | |

FOREIGN PATENT DOCUMENTS

| | | |
|---|---|---|
| EP | 0886454 | 12/1998 |
| EP | 1052816 | 11/2000 |
| EP | 1052816 A2 | 11/2000 |
| EP | 1191751 | 3/2002 |
| EP | 1193938 | 3/2002 |
| EP | 1193938 | 4/2002 |
| EP | 1193938 A1 | 4/2002 |
| EP | 1300991 | 4/2003 |
| EP | 1300991 A1 | 4/2003 |
| EP | 1180882 | 10/2004 |
| EP | 1575224 | 2/2005 |
| EP | 1575224 | 9/2005 |

OTHER PUBLICATIONS

Chao, H-L, et al.: "Fair Scheduling with QoS Support in Wireless Ad Hoc Networks," IEEE Transactions on Wireless Communications, vol. 3, No. 6, Nov. 2004.

Information Sciences Institute, University of Southern California, "Internet Protocol DARPA Internet Program Protocol Specification," IETF Standard, Internet Engineering Task Force, IETF, CH, Sep. 1981.

Madubata, C.D.: "Prioritization of the Joint Battle Space Infosphere (JBI) Traffic and Priority with Reciprocity CAC Protocol for the JBI Network," System Theory, 2006 Proceeding of the Thirty-Eight Southeastern Symposium on Mar. 5, 2006.

Orda, A. et al.: "Routing with Packet Duplication and Elimination in Computer Networks," IEEE Transactions on Communications, vol. 36, No. 7, Jul. 1988.

Pancha, P., et al.: "A Delay-Minimizing Service Policy with Guaranteed Bandwidth for Real-Time Traffic," Internet Article, Aug. 23, 1995.

Perkins, Charles E., et al.: "Quality of Service for Ad hoc On-Demand Distance Vector Routing draft-perkins-manet-aodvqos-01.txt," IETF Standard-Working-Draft, Internet Engineering Task Force, IETF, Ch. No. 1, Oct. 14, 2003.

Robels, Tomas, et al.: "QoS Support for an All-IP System Beyond 3G," IEEE Communications Magazine, vol. 39, No. 8, Aug. 2001.

Schoenwaelder, J., "Overview of the 2002 IAB Network Management Workshop," IETF Standard, Internet Engineering Task Force, May 2003.

Xue, Jianbo, et al.: "ASAP: An Adaptive QoS Protocol for Mobile Ad Hoc Networks," Personal, Indoor and Mobile Radio Communications, 2003. PIMRC 203. 14th IEEE Proceedings on Sep. 7-10, 2003, vol. 2, Sep. 7, 2003.

International Search Report and Written Opinion, dated Dec. 12, 2007, for International application No. PCT/US2007/071177, filed Jun. 14, 2007.

International Search Report and Written Opinion, dated Jan. 29, 2008, for International application No. PCT/US2007/071191, filed Jun. 14, 2007.

International Search Report and Written Opinion, dated Jan. 17, 2008, for International application No. PCT/US2007/071273, filed Jun. 14, 2007.

International Search Report and Written Opinion, dated Dec. 12, 2007, for International application No. PCT/US2007/071440, filed Jun. 18, 2007.
International Search Report and Written Opinion, dated Jan. 2, 2008, for International application No. PCT/US2007/073301, filed Jul. 12, 2007.
International Search Report and Written Opinion, dated Jan. 15, 2008, for International application No. PCT/US2007/074577, filed Jul. 27, 2007.
International Search Report and Written Opinion, dated Jan. 24, 2008, for International application No. PCT/US2007/074587, filed Jul. 27, 2007.
International Search Report and Written Opinion, dated Feb. 6, 2008, for International application No. PCT/US2007/074592, filed Jul. 27, 2007.
International Search Report and Written Opinion, dated Jan. 22, 2008, for International application No. PCT/US2007/074599, filed Jul. 27, 2007.
International Search Report and Written Opinion, dated Mar. 14, 2008, for International application No. PCT/US2007/011649, filed May 15, 2007.
Office Action, dated Apr. 2, 2008, for U.S. Appl. No. 11/416,057, filed May 2, 2006.
Office Action, dated Apr. 4, 2008, for U.S. Appl. No. 11/415,914, filed May 5, 2006.
Advisory Action dated Jan. 12, 2010, for U.S. Appl. No. 11/454,206, filed Jun. 16, 2006.
Office Action dated Oct. 13, 2009 for U.S. Appl. No. 11/471,923, filed Jun. 21, 2006.
Office Action dated Jan. 5, 2009, for U.S. Appl. No. 11/425,281, filed Jun. 20, 2006.
Office Action dated Jun. 5, 2009, for U.S. Appl. No. 11/416,057, filed May 2, 2006.
Office Action dated Jun. 10, 2009, for U.S. Appl. No. 11/454,517, filed Jun. 16, 2006.
Office Action dated Jul. 1, 2009, for U.S. Appl. No. 11/425,281, filed Jun. 20, 2006.
Office Action dated Jul. 15, 2009, for U.S. Appl. No. 11/454,219, filed Jun. 16, 2006.
Office Action dated Oct. 5, 2009, for U.S. Appl. No. 11/496,107, filed Jul. 31, 2006.
Office Action dated Oct. 13, 2009, for U.S. Appl. No. 11/454,219, filed Jun. 16, 2006.
Office Action dated Oct. 15, 2009, for U.S. Appl. No. 11/425,281, filed Jun. 20, 2006.
Office Action dated Dec. 30, 2009, for U.S. Appl. No. 11/416,057, filed May 2, 2006.
Office Action dated May 27, 2009, for U.S. Appl. No. 11/454,662, filed Jun. 16, 2006.
Office Action dated Sep. 18, 2009 for U.S. Appl. No. 11/454,662, filed Jun. 16, 2006.
Office Action dated May 13, 2009 for U.S. Appl. No. 11/424,635, filed Jun. 16, 2006.
Office Action dated Dec. 10, 2009 for U.S. Appl. No. 11/424,635, filed Jun. 16, 2006.
Office Action dated Oct. 13, 2009 for U.S. Appl. No. 11/416,043, filed May 2, 2006.
Office Action dated Sep. 15, 2009 for U.S. Appl. No. 11/454,220, filed Jun. 16, 2006.
Office Action dated May 1, 2009 for U.S. Appl. No. 11/461,052, filed Jul. 31, 2006.
Office Action dated Dec. 15, 2009 for U.S. Appl. No. 11/461,052, filed Jul. 31, 2006.
Office Action dated Jun. 25, 2009 for U.S. Appl. No. 11/461,082, filed Jul. 31, 2006.
Office Action dated Oct. 28, 2009 for U.S. Appl. No. 11/461,082, filed Jul. 31, 2006.
Office Action dated Jun. 10, 2009 for U.S. Appl. No. 11/425,289, filed Jun. 20, 2006.
Office Action dated Jun. 10, 2009 for U.S. Appl. No. 11/454,519, filed Jun. 16, 2006.
Office Action dated Dec. 30, 2009 for U.S. Appl. No. 11/454,519, filed Jun. 16, 2006.
Office Action dated Jul. 1, 2009 for U.S. Appl. No. 11/436,912, filed May 18, 2006.
Office Action dated Jan. 6, 2010 for U.S. Appl. No. 11/436,912, filed May 18, 2006.
Office Action dated Jul. 21, 2009 for U.S. Appl. No. 11/457,662, filed Jul. 14, 2006.
Office Action dated Dec. 30, 2009 for U.S. Appl. No. 11/457,662, filed Jul. 14, 2006.
Office Action dated Jun. 1, 2009 for U.S. Appl. No. 11/461,242, filed Jul. 31, 2006.
Office Action dated Dec. 30, 2009 for U.S. Appl. No. 11/461,242, filed Jul. 31, 2006.
Office Action dated Oct. 26, 2009 for U.S. Appl. No. 11/454,206, filed Jun. 16, 2006.
Office Action dated Jan. 5, 2010 for U.S. Appl. No. 11/454,517, filed Jun. 16, 2006.
Office Action dated Aug. 31, 2009 for U.S. Appl. No. 11/415,914, filed May 2, 2006.
Office Action dated Jun. 15, 2009 for U.S. Appl. No. 11/425,021, filed Jun. 19, 2006.
Office Action dated Mar. 16, 2010 for U.S. Appl. No. 11/454,220, filed Jun. 16, 2006.
Office Action dated Mar. 18, 2010 for U.S. Appl. No. 11/496,107, filed Jul. 31, 2006.
Office Action dated Mar. 12, 2010 for U.S. Appl. No. 11/416,057, filed May 2, 2006.
Office Action dated Mar. 15, 2010 for U.S. Appl. No. 11/454,519, filed Jun. 16, 2006.
Office Action dated Mar. 15, 2010 for U.S. Appl. No. 11/454,662, filed Jun. 16, 2006.
Office Action dated Mar. 16, 2010 for U.S. Appl. No. 11/461,242, filed Jul. 31, 2006.
Office Action dated Jan. 28, 2010 for U.S. Appl. No. 11/454,219, filed Jun. 16, 2006.
Office Action dated Mar. 31, 2010 for U.S. Appl. No. 11/454,517, filed Jun. 16, 2006.
International Preliminary Report for PCTUS200707/436 dated Oct. 10, 2008.
ISR for PCTUS200707/436 dated Nov. 9, 2007.
Written Opinion of ISR for PCTUS200707/436 dated Nov. 9, 2007.
Extended European Search Report for PCTUS2007010558 dated Apr. 12, 2009.
International Search Report for PCTUS2007011651 dated Mar. 16, 2010.
Consultative Committee for Space Data Systems, "CCSDS File Delivery Protocol (CFDP)—Part 2—Implementers Guide," CCSDS 720.2-G-2—Green Book, Sep. 2003.
Akimeka, "LLC—Mobile Modular Command Center (M2C2) Advanced Technologies Training Program (ATTP) Final Analysis Report," 2004.
Ali et al., "Solider Network Extension (SNE) On-The-Move Satellite Communications (SATCOM) for Army Tactical Battalion-Level Network Healing and Thickening," Oct. 2007.
Applecore, "What are APIs, why use them, how to use them, and how to find out more," pp. 1-3, May 2005.
Barker, "Overcoming the Data-Scale Management Challenge in Large Dynamic Networks," Military Communications Conference, MILCOM 2005, IEEE; pp. 1-7, Oct. 2005.
Laurie, "DLL Files in Windows—What Are They?," pp. 1-2, 2004.
Lee et al., "Expected File-Delivery Time of Deferred NAK ARQ in CCSDS File-Delivery Protocol," IEEE Transactions on Communications, vol. 52, Issue 8, pp. 1408-1416, Aug. 2004.
Zheng et al., "Group-Mobility-Aware Spectrum Management for Future Digital Battlefields," Military Communications Conference, 2006, MILCOM 2006, IEEE; pp. 1-7, Oct. 2006.
Floyd et al., "Link-sharing and Resource Management Models for Packet Networks," IEEE/ACM Transactions on Networking, vol. 3, No. 4, all pages, Aug. 1995.
Chan, "Precedence Based Admission Control and Preemption in IP Networks," Military Communications Conference, 2006, MILCOM 2006, IEEE, pp. 1-7, Oct. 2006.
Office Action dated Apr. 20, 2010 for U.S. Appl. No. 11/425,281, filed Jun. 20, 2006.

Advisory Action dated Apr. 13, 2010 for U.S. Appl. No. 11/454,219, filed Jun. 16, 2006.
Notice of Panel Decision from Pre-Appeal Brief Review dated Jul. 7, 2010 for U.S. Appl. No. 11/454,219, filed Jun. 16, 2006.
Examiner's Answer to Appeal Brief dated Jul. 8, 2010 for U.S. Appl. No. 11/454,206, filed Jun. 16, 2006.
Notice of Panel Decision from Pre-Appeal Brief Review dated Mar. 26, 2010 for U.S. Appl. No. 11/454,206, filed Jun. 16, 2006.
Office Action dated May 20, 2010 for U.S. Appl. No. 11/454,517, filed Jun. 16, 2006.
Dong et al., "APV: A Highly Efficient Transport Protocol for Low Bit Rate Multimedia Connections," Multimedia Tools and Applications, pp. 187-216, 2005.
Communication Pursuant to Article 94(3) EPC, Application No. 07812151.4, dated Jan. 21, 2010.
Office Action dated May 6, 2010 for U.S. Appl. No. 11/425,021, filed Jun. 19, 2006.
Office Action dated Apr. 27, 2010 for U.S. Appl. No. 11/424,635, filed Jun. 16, 2006.
Advisory Action dated May 13, 2010 for U.S. Appl. No. 11/454,220, filed Jun. 16, 2006.
Information Sciences Institute, "Internet Protocol Darpa Internet Program Protocol Specification," pp. 1-46, Sep. 1981.
Communication Pursuant to Article 94(3) EPC, Application No. 07813469.9, dated Nov. 17, 2009.
Office Action dated Apr. 27, 2010 for U.S. Appl. No. 11/461,082, filed Jul. 31, 2006.
Office Action dated May 11, 2010 for U.S. Appl. No. 11/425,289, filed Jun. 20, 2006.
Communication Pursuant to Rule 62 EPC, Application No. 07777069.1, dated Mar. 16, 2010.
Notice of Panel Decision from Pre-Appeal Brief Review, dated Jun. 2, 2010 for U.S. Appl. No. 11/436,912, filed May 18, 2006.
Office Action dated Jun. 10, 2010 for U.S. Appl. No. 11/457,662, filed Jul. 14, 2006.
Office Action dated Sep. 30, 2010 for U.S. Appl. No. 11/425,281, filed Jun. 20, 2006, pp. 1-13.
Korean Office Action mailed Jul. 27, 2010, in Appl. No. 10-2009-7000812, pp. 3-1 to 3-3.
Office Action dated Sep. 13, 2010 for U.S. Appl. No. 11/416,057, filed May 2, 2006, pp. 1-14.
Advisory Action dated Aug. 23, 2010 for U.S. Appl. No. 11/454,517, filed Jun. 16, 2006, pp. 1-2.
Office Action dated Aug. 24, 2010 for U.S. Appl. No. 11/425,021, filed Jun. 19, 2006, pp. 1-19.
International Preliminary Report for PCT/US2007/071159 dated Dec. 16, 2008, pp. 1-7.
Madubata, C., "Prioritization Of The Joint Battle Space Infosphere (JBI) Traffic And Priority With Reciprocity CAC Protocol For The JBI Network," System Theory, 2006 Proceeding of the Thirty-Eighth Southeastern Symposium, USA, IEEE; pp. 477-481, Mar. 5, 2006.
ISR for PCT/US2007/071159 dated Oct. 31, 2007, pp. 1-2.
Advisory Action dated Jul. 23, 2010 for U.S. Appl. No. 11/424,635, filed Jun. 16, 2006, pp. 1-2.
Translation of Japanese Office Action for Patent Application No. 2009-509667, mailed Aug. 10, 2010, pp. 1-2.
Advisory Action dated Sep. 30, 2010 for U.S. Appl. No. 11/461,082, filed Jul. 31, 2006, pp. 1-2.
Office Action dated Sep. 17, 2010 for U.S. Appl. No. 11/454,519, filed Jun. 16, 2006, pp. 1-16.
Office Action dated Sep. 14, 2010 for U.S. Appl. No. 11/461,242, filed Jul. 31, 2006, pp. 1-31.
Bakre A. V. et al: "Implementation and Performance Evaluation of Indirect TCP" IEEE Transactions on Computers, vol. 46, No. 3, Mar. 1997.
"CCSDS File Delivery Protocol (CFDP)—Part 1—Introduction and Overview" (CCSDS 720.1-G-2—Green Book, Sep. 2003).
"CCSDS File Delivery Protocol (CFDP) Part 2—Implementers Guide" (CCSDS 720.2-G-2, Green Book, Sep. 2003).
Chao, H-L, et al.: "Fair Scheduling with QoS Support in Wireless Ad Hoc Networks," IEEE Transactions on Wireless Communications, vol. 3, No. 6, Nov. 2004.
Gao et al., "Performance Evaluation of the CCSDS File Delivery Protocol—Latency and Storage Requirement", Dec. 10, 2004.
Information Sciences Institute, University of Southern California, "Internet Protocol DARPA Internet Program Protocol Specification," IETF Standard, Internet Engineering Task Force, IETF, CH, Sep. 1981.
International Preliminary Report on Patentability dated Feb. 6, 2008 for International Application No. PCT/US2007/071269 filed Jun. 14, 2007.
International Search Report and Written Opinion dated Apr. 28, 2008 for International Application No. PCT/US07/11650 filed May 15, 2007.
International Search Report and Written Opinion dated Apr. 28, 2008 for International Application No. PCT/US07/10559 filed May 1, 2007.
International Search Report and Written Opinion dated Apr. 29, 2008 for International Application No. PCT/US07/10558 filed May 15, 2007.
International Search Report and Written Opinion dated Jun. 5, 2008 for International Application No. PCT/US07/11651 filed May 15, 2007.
International Search Report and Written Opinion, dated Dec. 12, 2007, for International Application No. PCT/US2007/071177, Filed Jun. 14, 2007.
International Search Report and Written Opinion, dated Dec. 12, 2007, for International Application No. PCT/US2007/071440, filed Jun. 18, 2007.
International Search Report and Written Opinion, dated Feb. 6, 2008, for International Application No. PCT/US2007/074592, filed Jul. 27, 2007.
International Search Report and Written Opinion, dated Jan. 15, 2008 for International Application No. PCT/US2007/074577, filed Jul. 27, 2007.
International Search Report and Written Opinion, dated Jan. 17, 2008, for International Application No. PCT/US2007/071273, filed Jun. 14, 1997.
International Search Report and Written Opinion, dated Jan. 2, 2008, for International Application No. PCT/US2007/073301, filed Jul. 12, 2007.
International Search Report and Written Opinion, dated Jan. 22, 2008, for International Application No. PCT/US2007/074599, filed Jul. 27, 2007.
International Search Report and Written Opinion, dated Jan. 24, 2008, for International Application No. PCT/US2007/074587, filed Jul. 27, 2007.
International Search Report and Written Opinion, dated Mar. 14, 2008, for International Application No. PCT/US2007/011649 filed May 15, 2007.
International Search Report and Written Opinion, dated Jan. 29, 2008, for International Application No. PCT/US2007/071191. filed Jun. 14, 1997.
International Search Report and Written Opinion, dated Jan. 2, 2008 for International Application No. PCT/US2007/073301, filed Jul. 12, 2007.
Lee, et al., "Expected File-Delivery Time of Deferred NAK ARQ in CCSDS File-Delivery Protocol", Aug. 2004, IEEE Transactions on Communications, vol. 52 Issue 8. pp. 1408-1416.
Madubata, C.D.: "Prioritization of the Joint Battle Space Infosphere (JBI) Traffic and Priority with Reciprocity CAC Protocol for the JBI Network," System Theory, 2006 Proceeding of the Thirty-Eighth Southeastern Symposium on Mar. 5, 2006.
Office Action dated Apr. 23, 2008, for U.S. Appl. No. 11/416,043, filed May 2, 2006.
Office Action dated Oct. 20, 2008, for U.S. Appl. No. 11/416,043, filed May 2, 2006.
Office Action dated Dec. 22, 2008, for U.S. Appl. No. 11/425,021, filed Jun. 19, 2006.
Office Action dated Jan. 5, 2009, for U.S. Appl. No. 11/425,281, filed Jun. 20, 2006.
Office Action dated Jan. 30, 2009, for U.S. Appl. No. 11/425,289, filed Jun. 20, 2006.
Office Action dated Feb. 5, 2009, for U.S. Appl. No. 11/436,912, filed May 18, 2006.

Office Action dated May 21, 2008, for U.S. Appl. No. 11/436,912, filed May 18, 2009.
Office Action dated Oct. 16, 2008, for U.S. Appl. No. 11/436,912, filed May 18, 2006.
Office Action dated Apr. 1, 2009, for U.S. Appl. No. 11/454,206, filed Jun. 16, 2006.
Office Action dated May 30, 2008, for U.S. Appl. No. 11/454,206, filed Jun. 16, 2006.
Office Action dated Dec. 11, 2008, for U.S. Appl. No. 11/454,206, filed Jun. 16, 2006.
Office Action dated May 30, 2008, for U.S. Appl. No. 11/454,219, filed Jun. 16, 2006.
Office Action dated Dec. 15, 2008, for U.S. Appl. No. 11/454,219, filed Jun. 16, 2006.
Office Action dated Nov. 25, 2008, for U.S. Appl. No. 11/454,220, filed Jun. 16, 2006.
Office Action dated Dec. 4, 2008, for U.S. Appl. No. 11/454,662, filed Jun. 16, 2006.
Office Action dated Dec. 29, 2008, for U.S. Appl. No. 11/457,662, filed Jul. 14, 2006.
Office Action dated Nov. 13, 2008, for U.S. Appl. No. 11/461,082, filed Jul. 31, 2006.
Office Action dated Mar. 6, 2009, for U.S. Appl. No. 11/471,923, filed Jun. 21, 2006.
Office Action dated Oct. 17, 2008, for U.S. Appl. No. 11/416,057, filed May 2, 2006.
Office Action dated Feb. 9, 2009, for U.S. Appl. No. 11/416,057, filed May 2, 2006.
Office Action dated Apr. 2, 2008, for U.S. Appl. No. 11/416,057, filed May 2, 2006.
Office Action dated Apr. 2, 2009, for U.S. Appl. No. 11/415,914, filed May 5, 2006.
Office Action dated Oct. 20, 2008, for U.S. Appl. No. 11/415,914, filed May 5, 2006.
Office Action dated Apr. 2, 2008, for U.S. Appl. No. 11/415,914, filed May 5, 2006.
Office Action dated Apr. 21, 2009, for U.S. Appl. No. 11/454,220, filed Jun. 16, 2006.
Orda, A. et al.,: "Routing with Packet Duplication and Elimination in Computer Networks," IEEE Transactions on Communications, vol. 36, No. 7, Jul. 1988.
Pancha, P. et al.: "A Delay-Minimizing Service Policy with Guaranteed Bandwidth for Real-Time Traffic," Internet Article, Aug. 23, 1995.
Perkins, Charles E., et al.: "Quality of Service for Ad hoc On-Demand Distance Vector Routing draft-perkins-manet-aodvqos-01.txt," IETF Standard-Working-Draft, Internet Engineering Task Force, IETF, Ch. No. 1, Oct. 14, 2003.
Robles, Tomas et al.: "QoS Support for an All-IP System Beyond 3G," IEEE Communications Magazine, vol. 39, No. 8, Aug. 2001.
Schoenwaelder, J., "Overview of the 2002 IAB Network Management Workshop," IETF Standard, Internet Engineering Task Force, May 2003.
Tactical Data Network (TDN). USMC Concepts + Programs 2003. p. 140.
Xue, Jianbo, et al.: "ASAP: An Adaptive QoS Protocol for Mobile Ad Hoc Networks," Personal, Indoor and Mobile Radio Communications, 2003. PIMRC 203. 14th IEEE Proceedings on Sep. 7-10, 2003, vol. 2, Sep. 7, 2003.
Office Action dated Apr. 27, 2009 for U.S. Appl. No. 11/416,043.
Office Action dated Nov. 9, 2010 for U.S. Appl. No. 11/496,107 filed Jul. 31, 2006, pp. 1-15.
Advisory Action dated Nov. 2, 2010 for U.S. Appl. No. 11/454,219 filed Jun. 16, 2006, pp. 1-4.
Office Action dated Nov. 23, 2010 for U.S. Appl. No. 11/454,219 filed Jun. 16, 2006, pp. 1-22.
Office Action dated Dec. 6, 2010 for U.S. Appl. No. 11/454,220 filed Jun. 16, 2006, pp. 1-12.
Office Action dated Oct. 25, 2010 for U.S. Appl. No. 11/425,289 filed Jun. 20, 2006, pp. 1-23.
Office Action dated Nov. 18, 2010 for U.S. Appl. No. 11/457,662 filed Jul. 14, 2006, pp. 1-20.
Korean Office Action mailed Oct. 27, 2010 for Korean Application No. 2009-7001125, pp. 1-3.

* cited by examiner

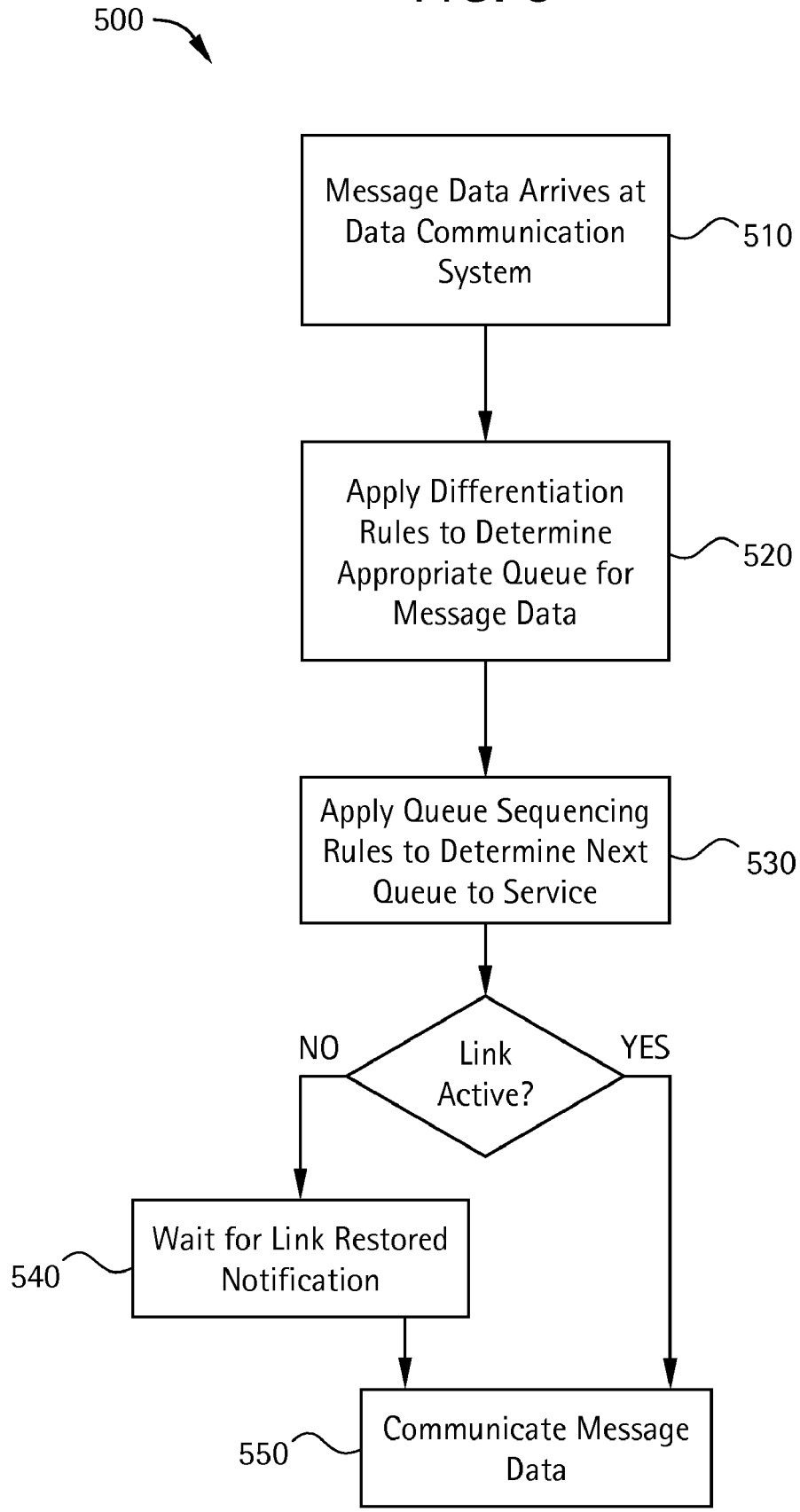

METHOD AND SYSTEM FOR FAULT-TOLERANT QUALITY OF SERVICE

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The presently described technology generally relates to communications networks. More particularly, the presently described technology relates to systems and methods for providing a Quality of Service mechanism that is tolerant of an unreliable physical layer.

Communications networks are utilized in a variety of environments. Communications networks typically include two or more nodes connected by one or more links. Generally, a communications network is used to support communication between two or more participant nodes over the links and intermediate nodes in the communications network. There may be many kinds of nodes in the network. For example, a network may include nodes such as clients, servers, workstations, switches, and/or routers. Links may be, for example, modem connections over phone lines, wires, Ethernet links, Asynchronous Transfer Mode (ATM) circuits, satellite links, and/or fiber optic cables.

A communications network may actually be composed of one or more smaller communications networks. For example, the Internet is often described as network of interconnected computer networks. Each network may utilize a different architecture and/or topology. For example, one network may be a switched Ethernet network with a star topology and another network may be a Fiber-Distributed Data Interface (FDDI) ring.

Communications networks may carry a wide variety of data. For example, a network may carry bulk file transfers alongside data for interactive real-time conversations. The data sent on a network is often sent in packets, cells, or frames. Alternatively, data may be sent as a stream. In some instances, a stream or flow of data may actually be a sequence of packets. Networks such as the Internet provide general purpose data paths between a range of nodes and carrying a vast array of data with different requirements.

Communication over a network typically involves multiple levels of communication protocols. A protocol stack, also referred to as a networking stack or protocol suite, refers to a collection of protocols used for communication. Each protocol may be focused on a particular type of capability or form of communication. For example, one protocol may be concerned with the electrical signals needed to communicate with devices connected by a copper wire. Other protocols may address ordering and reliable transmission between two nodes separated by many intermediate nodes, for example.

Protocols in a protocol stack typically exist in a hierarchy. Often, protocols are classified into layers. One reference model for protocol layers is the Open Systems Interconnection (OSI) model. The OSI reference model includes seven layers: a physical layer, data link layer, network layer, transport layer, session layer, presentation layer, and application layer. The physical layer is the "lowest" layer, while the application layer is the "highest" layer. Two well-known transport layer protocols are the Transmission Control Protocol (TCP) and User Datagram Protocol (UDP). A well known network layer protocol is the Internet Protocol (IP).

At the transmitting node, data to be transmitted is passed down the layers of the protocol stack, from highest to lowest. Conversely, at the receiving node, the data is passed up the layers, from lowest to highest. At each layer, the data may be manipulated by the protocol handling communication at that layer. For example, a transport layer protocol may add a header to the data that allows for ordering of packets upon arrival at a destination node. Depending on the application, some layers may not be used, or even present, and data may just be passed through.

One kind of communications network is a tactical data network. A tactical data network may also be referred to as a tactical communications network. A tactical data network may be utilized by units within an organization such as a military (e.g., army, navy, and/or air force). Nodes within a tactical data network may include, for example, individual soldiers, aircraft, command units, satellites, and/or radios. A tactical data network may be used for communicating data such as voice, position telemetry, sensor data, and/or real-time video.

An example of how a tactical data network may be employed is as follows. A logistics convoy may be in-route to provide supplies for a combat unit in the field. Both the convoy and the combat unit may be providing position telemetry to a command post over satellite radio links. An unmanned aerial vehicle (UAV) may be patrolling along the road the convoy is taking and transmitting real-time video data to the command post over a satellite radio link also. At the command post, an analyst may be examining the video data while a controller is tasking the UAV to provide video for a specific section of road. The analyst may then spot an improvised explosive device (IED) that the convoy is approaching and send out an order over a direct radio link to the convoy for it to halt and alerting the convoy to the presence of the IED.

The various networks that may exist within a tactical data network may have many different architectures and characteristics. For example, a network in a command unit may include a gigabit Ethernet local area network (LAN) along with radio links to satellites and field units that operate with much lower throughput and higher latency. Field units may communicate both via satellite and via direct path radio frequency (RF). Data may be sent point-to-point, multicast, or broadcast, depending on the nature of the data and/or the specific physical characteristics of the network. A network may include radios, for example, set up to relay data. In addition, a network may include a high frequency (HF) network which allows long rang communication. A microwave network may also be used, for example. Due to the diversity of the types of links and nodes, among other reasons, tactical networks often have overly complex network addressing schemes and routing tables. In addition, some networks, such as radio-based networks, may operate using bursts. That is, rather than continuously transmitting data, they send periodic bursts of data. This is useful because the radios are broadcasting on a particular channel that must be shared by all participants, and only one radio may transmit at a time.

Tactical data networks are generally bandwidth-constrained. That is, there is typically more data to be communicated than bandwidth available at any given point in time. These constraints may be due to either the demand for bandwidth exceeding the supply, and/or the available communications technology not supplying enough bandwidth to meet the user's needs, for example. For example, between some nodes, bandwidth may be on the order of kilobits/sec. In bandwidth-constrained tactical data networks, less important data can clog the network, preventing more important data from getting through in a timely fashion, or even arriving at a receiving node at all. In addition, portions of the networks may include internal buffering to compensate for unreliable links. This may cause additional delays. Further, when the buffers get full, data may be dropped.

In many instances the bandwidth available to a network cannot be increased. For example, the bandwidth available over a satellite communications link may be fixed and cannot effectively be increased without deploying another satellite. In these situations, bandwidth must be managed rather than simply expanded to handle demand. In large systems, network bandwidth is a critical resource. It is desirable for applications to utilize bandwidth as efficiently as possible. In addition, it is desirable that applications avoid "clogging the pipe," that is, overwhelming links with data, when bandwidth is limited. When bandwidth allocation changes, applications should preferably react. Bandwidth can change dynamically due to, for example, quality of service, jamming, signal obstruction, priority reallocation, and line-of-sight. Networks can be highly volatile and available bandwidth can change dramatically and without notice.

In addition to bandwidth constraints, tactical data networks may experience high latency. For example, a network involving communication over a satellite link may incur latency on the order of half a second or more. For some communications this may not be a problem, but for others, such as real-time, interactive communication (e.g., voice communications), it is highly desirable to minimize latency as much as possible.

Another characteristic common to many tactical data networks is data loss. Data may be lost due to a variety of reasons. For example, a node with data to send may be damaged or destroyed. As another example, a destination node may temporarily drop off of the network. This may occur because, for example, the node has moved out of range, the communication's link is obstructed, and/or the node is being jammed. Data may be lost because the destination node is not able to receive it and intermediate nodes lack sufficient capacity to buffer the data until the destination node becomes available. Additionally, intermediate nodes may not buffer the data at all, instead leaving it to the sending node to determine if the data ever actually arrived at the destination.

Often, applications in a tactical data network are unaware of and/or do not account for the particular characteristics of the network. For example, an application may simply assume it has as much bandwidth available to it as it needs. As another example, an application may assume that data will not be lost in the network. Applications which do not take into consideration the specific characteristics of the underlying communications network may behave in ways that actually exacerbate problems. For example, an application may continuously send a stream of data that could just as effectively be sent less frequently in larger bundles. The continuous stream may incur much greater overhead in, for example, a broadcast radio network that effectively starves other nodes from communicating, whereas less frequent bursts would allow the shared bandwidth to be used more effectively.

Certain protocols do not work well over tactical data networks. For example, a protocol such as TCP may not function well over a radio-based tactical network because of the high loss rates and latency such a network may encounter. TCP requires several forms of handshaking and acknowledgments to occur in order to send data. High latency and loss may result in TCP hitting time outs and not being able to send much, if any, meaningful data over such a network.

Information communicated with a tactical data network often has various levels of priority with respect to other data in the network. For example, threat warning receivers in an aircraft may have higher priority than position telemetry information for troops on the ground miles away. As another example, orders from headquarters regarding engagement may have higher priority than logistical communications behind friendly lines. The priority level may depend on the particular situation of the sender and/or receiver. For example, position telemetry data may be of much higher priority when a unit is actively engaged in combat as compared to when the unit is merely following a standard patrol route. Similarly, real-time video data from an UAV may have higher priority when it is over the target area as opposed to when it is merely in-route.

There are several approaches to delivering data over a network. One approach, used by many communications networks, is a "best effort" approach. That is, data being communicated will be handled as well as the network can, given other demands, with regard to capacity, latency, reliability, ordering, and errors. Thus, the network provides no guarantees that any given piece of data will reach its destination in a timely manner, or at all. Additionally, no guarantees are made that data will arrive in the order sent or even without transmission errors changing one or more bits in the data.

Another approach is Quality of Service (QoS). QoS refers to one or more capabilities of a network to provide various forms of guarantees with regard to data that is carried. For example, a network supporting QoS may guarantee a certain amount of bandwidth to a data stream. As another example, a network may guarantee that packets between two particular nodes have some maximum latency. Such a guarantee may be useful in the case of a voice communication where the two nodes are two people having a conversation over the network. Delays in data delivery in such a case may result in irritating gaps in communication and/or dead silence, for example.

QoS may be viewed as the capability of a network to provide better service to selected network traffic. The primary goal of QoS is to provide priority including dedicated bandwidth, controlled jitter and latency (required by some real-time and interactive traffic), and improved loss characteristics. Another important goal is making sure that providing priority for one flow does not make other flows fail. That is, guarantees made for subsequent flows must not break the guarantees made to existing flows.

Current approaches to QoS often require every node in a network to support QoS, or, at the very least, for every node in the network involved in a particular communication to support QoS. For example, in current systems, in order to provide a latency guarantee between two nodes, every node carrying the traffic between those two nodes must be aware of and agree to honor, and be capable of honoring, the guarantee.

There are several approaches to providing QoS. One approach is Integrated Services, or "IntServ." IntServ provides a QoS system wherein every node in the network supports the services and those services are reserved when a connection is set up. IntServ does not scale well because of the large amount of state information that must be maintained at every node and the overhead associated with setting up such connections.

Another approach to providing QoS is Differentiated Services, or "DiffServ." DiffServ is a class of service model that enhances the best-effort services of a network such as the Internet. DiffServ differentiates traffic by user, service requirements, and other criteria. Then, DiffServ marks packets so that network nodes can provide different levels of service via priority queuing or bandwidth allocation, or by choosing dedicated routes for specific traffic flows. Typically, a node has a variety of queues for each class of service. The node then selects the next packet to send from those queues based on the class categories.

Existing QoS solutions are often network specific and each network type or architecture may require a different QoS configuration. Due to the mechanisms existing QoS solutions utilize, messages that look the same to current QoS systems may actually have different priorities based on message content. However, data consumers may require access to high-priority data without being flooded by lower-priority data. Existing QoS systems cannot provide QoS based on message content at the transport layer.

As mentioned, existing QoS solutions require at least the nodes involved in a particular communication to support QoS. However, the nodes at the "edge" of network may be adapted to provide some improvement in QoS, even if they are incapable of making total guarantees. Nodes are considered to be at the edge of the network if they are the participating nodes in a communication (i.e., the transmitting and/or receiving nodes) and/or if they are located at chokepoints in the network. A chokepoint is a section of the network where all traffic must pass to another portion. For example, a router or gateway from a LAN to a satellite link would be a choke point, since all traffic from the LAN to any nodes not on the LAN must pass through the gateway to the satellite link.

In many radio or wireless-based networks, the physical links are somewhat unreliable resulting in frequent link failures. When this occurs, data may be lost during the period the network is down. Currently, one way of handling problems with an unreliable physical link is by using small data buffering. Small data buffering is when a radio (for example) in a network provides small buffers that retain the data until successfully sent on a first in first out (FIFO) basis with no respect to the priority of the data (i.e., no QoS). When buffers are not used, some sort of data loss is accepted. Some applications tolerate data loss by continuing to send data regardless of physical link status. Other applications stop sending data when a physical link is detected as failed (referred to as throttling).

Thus, there is a need for systems and methods providing a QoS mechanism that is tolerant of an unreliable physical layer. More specifically, there is a need for adaptive, configurable QoS systems and methods in a tactical data network that provide a QoS-based buffering mechanism that can preserve large quantities of data sent by higher level applications until the physical link is returned to service.

BRIEF SUMMARY OF THE INVENTION

Certain embodiments of the present invention provide for a method for fault-tolerant QoS data communication. The method includes differentiating one or more message data into a primary storage, storing the differentiated one or more message data in a secondary storage if the primary storage becomes exhausted, prioritizing the one or more message data, and communicating the one or more message data. The one or more message data are differentiated based on one or more queue selection rules. The one or more message data are prioritized based on one or more queue sequencing rules. The one or more message data are communicated based at least in part on the prioritization of the one or more message data.

Certain embodiments of the present invention provide for a system for fault-tolerant QoS data communication. The system includes a differentiation component, a primary storage component, a secondary storage component, and a prioritization component. The differentiation component is adapted to differentiate one or more message data using one or more queue selection rules. The primary storage component is adapted to store the differentiated one or more message data. The secondary storage component is adapted to store the one or more message data if the primary storage component becomes exhausted. The prioritization component is adapted to prioritize the one or more message data using one or more queue sequencing rules.

Certain embodiments of the present invention provide for a computer-readable medium including a set of instructions for execution on a computer. The set of instructions includes a differentiation routine, a prioritization routine, and a communication routine. The differentiation routine is configured to differentiate one or more message data into one or more queues using one or more queue selection rules. The prioritization routine is configured to determine a priority for the one or more message data using one or more queue sequencing rules. The communication routine is configured to communicate the one or more message data based at least in part on the prioritization routine.

BRIEF DESCRIPTION OF SEVERAL VIEWS OF THE DRAWINGS

FIG. 5 illustrates a flow diagram for a method for fault-tolerant QoS data communication in accordance with an embodiment of the present invention.

Figure 1:
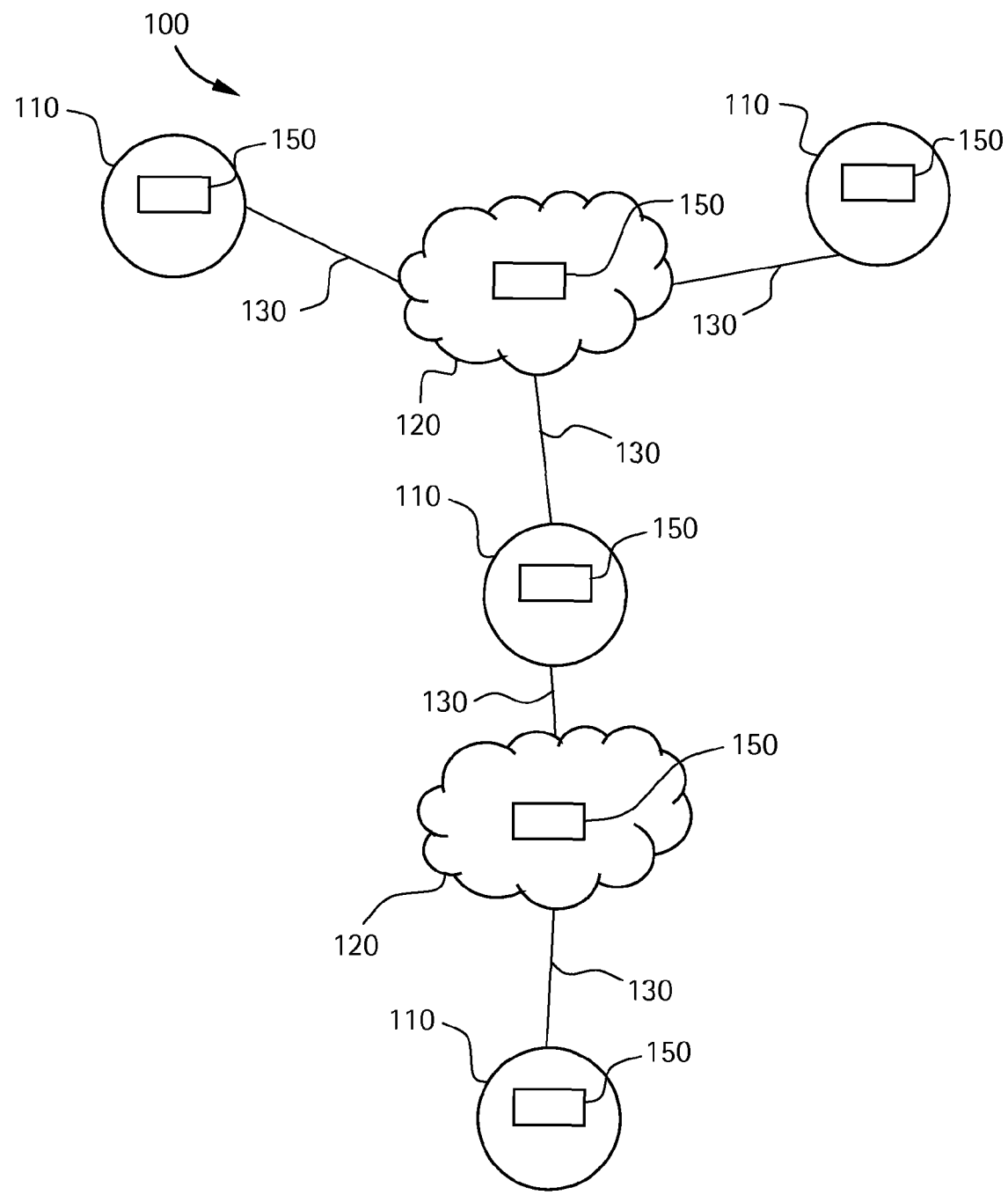
FIG. 1 illustrates a tactical communications network environment operating with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates a tactical communications network environment 100 operating with an embodiment of the present invention. The network environment 100 includes a plurality of communication nodes 110, one or more networks 120, one or more links 130 connecting the nodes and network(s), and one or more communication systems 150 facilitating communication over the components of the network environment 100. The following discussion assumes a network environment 100 including more than one network 120 and more than one link 130, but it should be understood that other environments are possible and anticipated.

Communication nodes 110 may be and/or include radios, transmitters, satellites, receivers, workstations, servers, and/or or other computing or processing devices, for example.

Network(s) 120 may be hardware and/or software for transmitting data between nodes 110, for example. Network(s) 120 may include one or more nodes 110, for example.

Link(s) 130 may be wired and/or wireless connections to allow transmissions between nodes 110 and/or network(s) 120.

The communications system 150 may include software, firmware, and/or hardware used to facilitate data transmission among the nodes 110, networks 120, and links 130, for example. As illustrated in FIG. 1, communications system 150 may be implemented with respect to the nodes 110, network(s) 120, and/or links 130: In certain embodiments, every node 110 includes a communications system 150. In certain embodiments, one or more nodes 110 include a communications system 150. In certain embodiments, one or more nodes 110 may not include a communications system 150.

Figure 2:
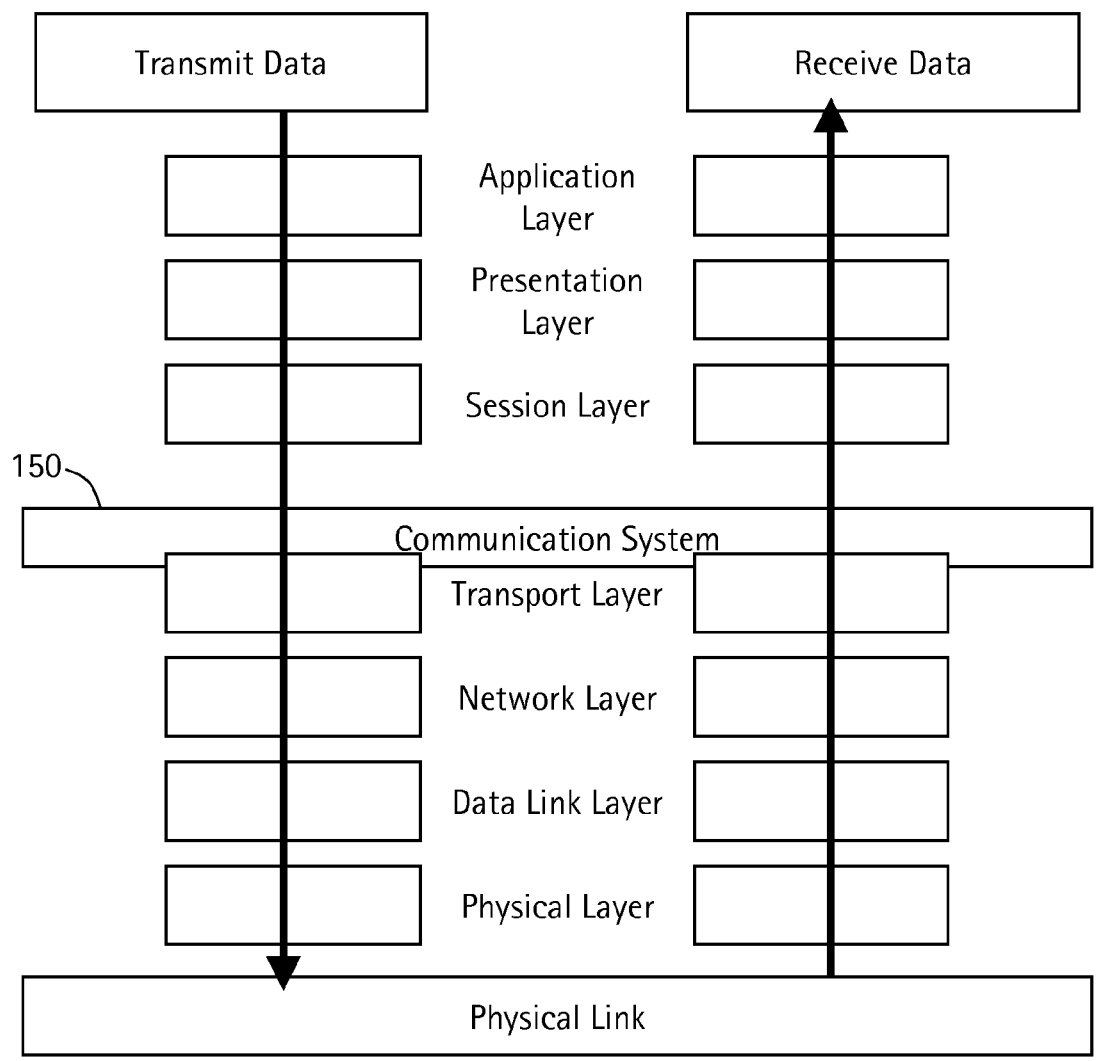
FIG. 2 shows the positioning of the data communications system in the seven layer OSI network model in accordance with an embodiment of the present invention.
Figure 3:
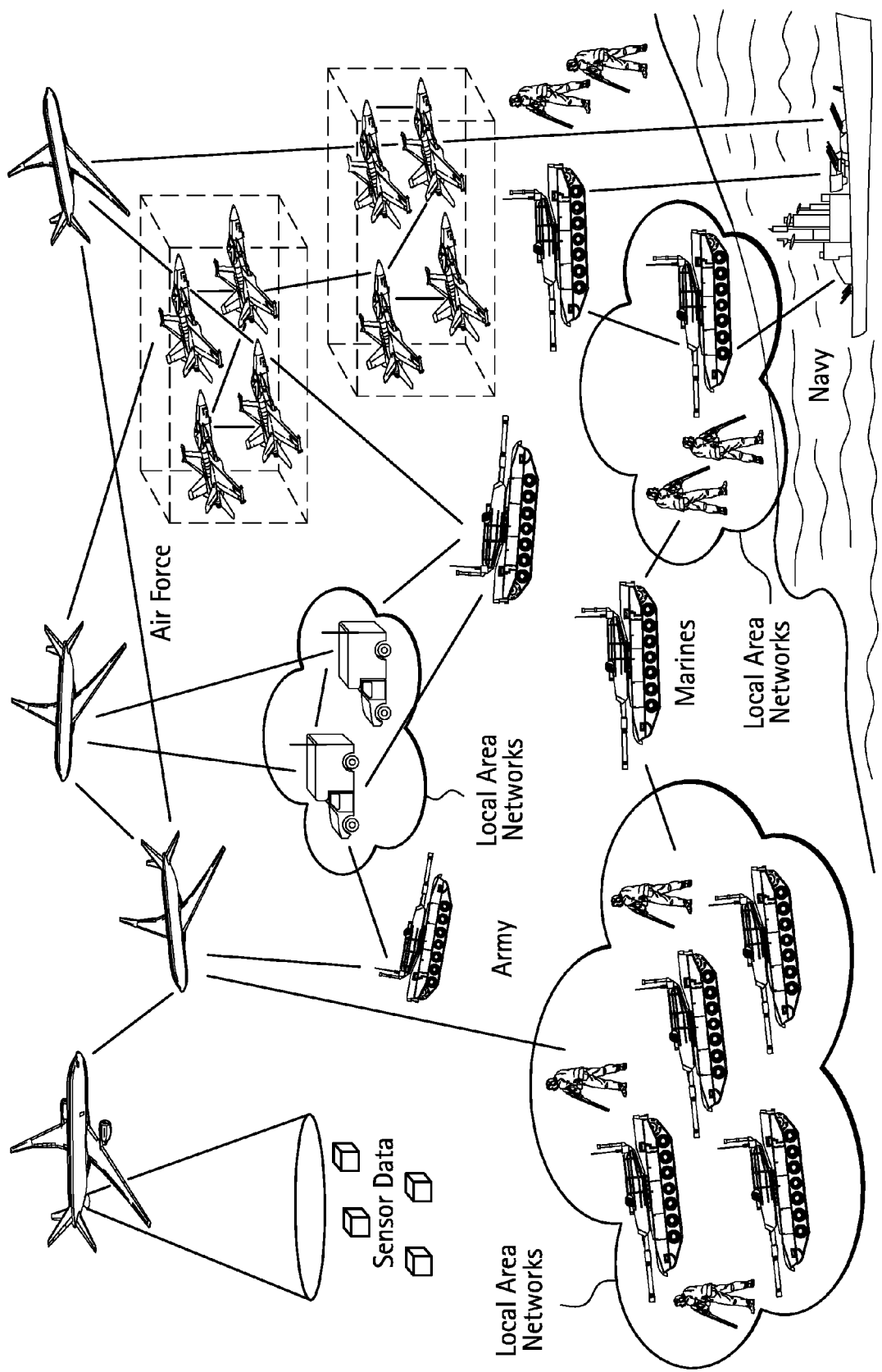
FIG. 3 depicts an example of multiple networks facilitated using the data communications system in accordance with an embodiment of the present invention.

The communication system 150 provides dynamic management of data to help assure communications on a tactical communications network, such as the network environment 100. As shown in FIG. 2, in certain embodiments, the system 150 operates as part of and/or at the top of the transport layer in the OSI seven layer protocol model. The system 150 may give precedence to higher priority data in the tactical network passed to the transport layer, for example. The system 150 may be used to facilitate communications in a single network, such as a local area network (LAN) or wide area network (WAN), or across multiple networks. An example of a multiple network system is shown in FIG. 3. The system 150 may be used to manage available bandwidth rather than add additional bandwidth to the network, for example.

In certain embodiments, the system 150 is a software system, although the system 150 may include both hardware and software components in various embodiments. The system 150 may be network hardware independent, for example. That is, the system 150 may be adapted to function on a variety of hardware and software platforms. In certain embodiments, the system 150 operates on the edge of the network rather than on nodes in the interior of the network. However, the system 150 may operate in the interior of the network as well, such as at "choke points" in the network.

The system 150 may use rules and modes or profiles to perform throughput management functions such as optimizing available bandwidth, setting information priority, and managing data links in the network. Optimizing bandwidth usage may include removing functionally redundant messages, message stream management or sequencing, and message compression, for example. By "optimizing" bandwidth, it is meant that the presently described technology can be employed to increase an efficiency of bandwidth use to communicate data in one or more networks. Setting information priority may include differentiating message types at a finer granularity than Internet Protocol (IP) based techniques and sequencing messages onto a data stream via a selected rule-based sequencing algorithm, for example. Data link management may include rule-based analysis of network measurements to affect changes in rules, modes, and/or data transports, for example. A mode or profile may include a set of rules related to the operational needs for a particular network state of health or condition. The system 150 provides dynamic, "on-the-fly" reconfiguration of modes, including defining and switching to new modes on the fly.

The communication system 150 may be configured to accommodate changing priorities and grades of service, for example, in a volatile, bandwidth-limited network. The system 150 may be configured to manage information for improved data flow to help increase response capabilities in the network and reduce communications latency. Additionally, the system 150 may provide interoperability via a flexible architecture that is upgradeable and scalable to improve availability, survivability, and reliability of communications. The system 150 supports a data communications architecture that may be autonomously adaptable to dynamically changing environments while using predefined and predictable system resources and bandwidth, for example.

In certain embodiments, the system 150 provides throughput management to bandwidth-constrained tactical communications networks while remaining transparent to applications using the network. The system 150 provides throughput management across multiple users and environments at reduced complexity to the network. As mentioned above, in certain embodiments, the system 150 runs on a host node in and/or at the top of layer four (the transport layer) of the OSI seven layer model and does not require specialized network hardware. The system 150 may operate transparently to the layer four interface. That is, an application may utilize a standard interface for the transport layer and be unaware of the operation of the system 150. For example, when an application opens a socket, the system 150 may filter data at this point in the protocol stack. The system 150 achieves transparency by allowing applications to use, for example, the TCP/IP socket interface that is provided by an operating system at a communication device on the network rather than an interface specific to the system 150. System 150 rules may be written in extensible markup language (XML) and/or provided via custom dynamic link libraries (DLL,s), for example.

In certain embodiments, the system 150 provides quality of service (QoS) on the edge of the network. The system's QoS capability offers content-based, rule-based data prioritization on the edge of the network, for example. Prioritization may include differentiation and/or sequencing, for example. The system 150 may differentiate messages into queues based on user-configurable differentiation rules, for example. The messages are sequenced into a data stream in an order dictated by the user-configured sequencing rule (e.g., starvation, round robin, relative frequency, etc.). Using QoS on the edge, data messages that are indistinguishable by traditional QoS approaches may be differentiated based on message content, for example. Rules may be implemented in XML, for example. In certain embodiments, to accommodate capabilities beyond XML and/or to support extremely low latency requirements, the system 150 allows dynamic link libraries to be provided with custom code, for example.

Inbound and/or outbound data on the network may be customized via the system 150. Prioritization protects client applications from high-volume, low-priority data, for example. The system 150 helps to ensure that applications receive data to support a particular operational scenario or constraint.

In certain embodiments, when a host is connected to a LAN that includes a router as an interface to a bandwidth-constrained tactical network, the system may operate in a configuration known as QoS by proxy. In this configuration, packets that are bound for the local LAN bypass the system and immediately go to the LAN. The system applies QoS on the edge of the network to packets bound for the bandwidth-constrained tactical link.

In certain embodiments, the system 150 offers dynamic support for multiple operational scenarios and/or network environments via commanded profile switching. A profile may include a name or other identifier that allows the user or system to change to the named profile. A profile may also include one or more identifiers, such as a functional redundancy rule identifier, a differentiation rule identifier, an archival interface identifier, a sequencing rule identifier, a pre-transmit interface identifier, a post-transmit interface identifier, a transport identifier, and/or other identifier, for example. A functional redundancy rule identifier specifies a rule that detects functional redundancy, such as from stale data or substantially similar data, for example. A differentiation rule identifier specifies a rule that differentiates messages into queues for processing, for example. An archival interface identifier specifies an interface to an archival system, for example. A sequencing rule identifier identifies a sequencing algorithm that controls samples of queue fronts and, therefore, the sequencing of the data on the data stream. A pre-transmit interface identifier specifies the interface for pre-transmit processing, which provides for special processing such as encryption and compression, for example. A post-transmit interface identifier identifies an interface for post-transmit processing, which provides for processing such as de-encryption and decompression, for example. A transport identifier specifies a network interface for the selected transport.

A profile may also include other information, such as queue sizing information, for example. Queue sizing information identifiers a number of queues and amount of memory and secondary storage dedicated to each queue, for example.

In certain embodiments, the system 150 provides a rules-based approach for optimizing bandwidth. For example, the system 150 may employ queue selection rules to differentiate messages into message queues so that messages may be assigned a priority and an appropriate relative frequency on the data stream. The system 150 may use functional redundancy rules to manage functionally redundant messages. A message is functionally redundant if it is not different enough (as defined by the rule) from a previous message that has not yet been sent on the network, for example. That is, if a new message is provided that is not sufficiently different from an older message that has already been scheduled to be sent, but has not yet been sent, the newer message may be dropped, since the older message will carry functionally equivalent information and is further ahead in the queue. In addition, functional redundancy many include actual duplicate messages and newer messages that arrive before an older message has been sent. For example, a node may receive identical copies of a particular message due to characteristics of the underlying network, such as a message that was sent by two different paths for fault tolerance reasons. As another example, a new message may contain data that supersedes an older message that has not yet been sent. In this situation, the system 150 may drop the older message and send only the new message. The system 150 may also include priority sequencing rules to determine a priority-based message sequence of the data stream. Additionally, the system 150 may include transmission processing rules to provide pre-transmission and post-transmission special processing, such as compression and/or encryption.

In certain embodiments, the system 150 provides fault tolerance capability to help protect data integrity and reliability. For example, the system 150 may use user-defined queue selection rules to differentiate messages into queues. The queues are sized according to a user-defined configuration, for example. The configuration specifies a maximum amount of memory a queue may consume, for example. Additionally, the configuration may allow the user to specify a location and amount of secondary storage that may be used for queue overflow. After the memory in the queues is filled, messages may be queued in secondary storage. When the secondary storage is also full, the system 150 may remove the oldest message in the queue, logs an error message, and queues the newest message. If archiving is enabled for the operational mode, then the de-queued message may be archived with an indicator that the message was not sent on the network.

Memory and secondary storage for queues in the system 150 may be configured on a per-link basis for a specific application, for example. A longer time between periods of network availability may correspond to more memory and secondary storage to support network outages. The system 150 may be integrated with network modeling and simulation applications, for example, to help identify sizing to help ensure that queues are sized appropriately and time between outages is sufficient to help achieve steady-state and help avoid eventual queue overflow.

Furthermore, in certain embodiments, the system 150 offers the capability to meter inbound ("shaping") and outbound ("policing") data. Policing and shaping capabilities help address mismatches in timing in the network. Shaping helps to prevent network buffers form flooding with high-priority data queued up behind lower-priority data. Policing helps to prevent application data consumers from being overrun by low-priority data. Policing and shaping are governed by two parameters: effective link speed and link proportion. The system 150 may form a data stream that is no more than the effective link speed multiplied by the link proportion, for example. The parameters may be modified dynamically as the network changes. The system may also provide access to detected link speed to support application level decisions on data metering. Information provided by the system 150 may be combined with other network operations information to help decide what link speed is appropriate for a given network scenario.

Figure 4:
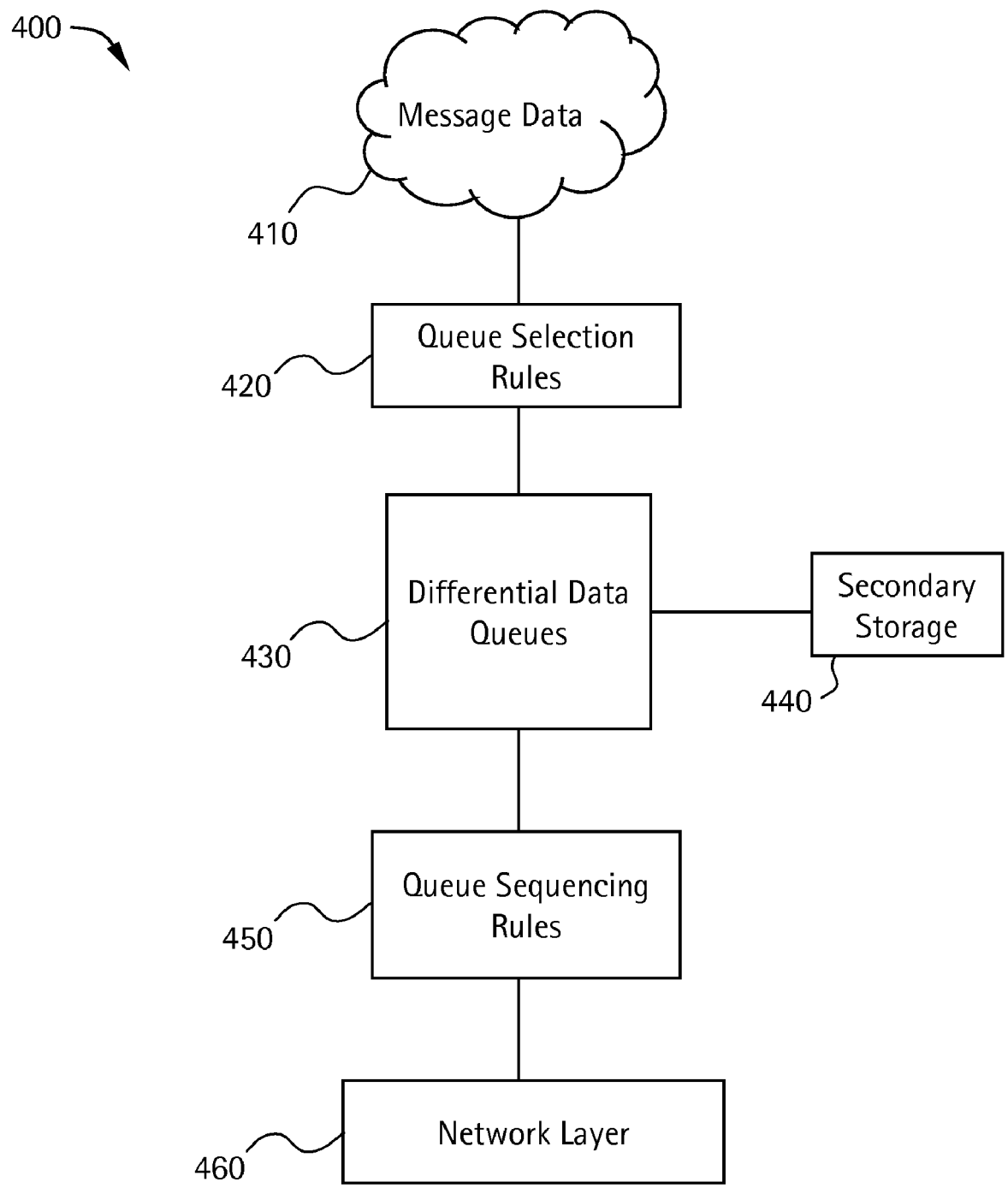
FIG. 4 illustrates a fault-tolerant QoS data communication system operating with an embodiment of the present invention.

FIG. 4 illustrates a fault-tolerant QoS data communication system 400 that provides data buffering with an embodiment of the present invention. The data communication system 400 includes one or more queue selection rules 420 and one or more queue sequencing rules 450 for receiving, storing, prioritizing, processing, communicating, and/or transmitting message data 410. The data communication system 400 also includes primary storage 430 and secondary storage 440 for storing, organizing, and/or prioritizing the data. As described above, the data communication system 400 operates between the transport and session layers in the OSI seven layer protocol model (See FIG. 2). The data communication system 400, using its differentiation rules 420 and queue sequencing rules 450, may give precedence to higher priority data in the tactical network passed to the transport layer, for example. Below, for exemplary purposes, primary storage 430 is referred to as differential data queues 430 and secondary storage 440 is referred to as secondary storage queues 440. However, the primary storage 430 and/or secondary storage 440 may be any type of structured memory such as, but not limited to, queues, lists, graphs and trees, for example.

The message data 410 received, stored, prioritized, processed, communicated, and/or transmitted by the data communication system 400 may include a block of data. The block of data may be, for example, a packet, cell, frame, and/or stream of data. For example, the data communication system 400 may receive packets of message data 410 from a source node, as described above. As another example, the data communication system 400 may process a stream of message data 410 from a source node, as described above.

In certain embodiments, the message data 410 includes protocol information. The protocol information may be used by one or more protocols to communicate the message data 410, for example. The protocol information may include, for example, a source address, a destination address, a source port, a destination port, and/or a protocol type. The source and/or destination address may be an IP address, for example. The protocol type may include the kind of protocol used for one or more layers of communication of the data. For example, the protocol type may be a transport protocol such as Transmission Control Protocol (TCP), User Datagram Protocol (UDP), or Stream Control Transmission Protocol (SCTP). As another example, the protocol type may include Internet Protocol (IP), Internetwork Packet Exchange (IPX), Ethernet, Asynchronous Transfer Mode (ATM), File Transfer Protocol (FTP), and/or Real-time Transport Protocol (RTP).

In certain embodiments, the message data 410 includes a header and a payload. The header may include some or all of the protocol information, for example. In certain embodiments, some or all of the protocol information is included in the payload. For example, protocol information may include information regarding a higher-level protocol stored in the payload portion of a block of message data 410.

In operation, message data 410 is provided and/or generated by one or more data sources, as described above. The message data 410 is received at the data communication system 400. The message data 410 may be received over one or more links, for example. For example, message data 410 may be provided to the data communication system 400 by an application running on the same system by an inter-process communication mechanism. As discussed above, the message data 410 may be a block of data, for example.

In certain embodiments, the data communication system 400 may apply user-defined queue selection rules 420 to differentiate and/or organize message data 410 into differential data queues 430. The queue selection rules 420 may be written in XML and/or provided via custom DLLs, for example. A queue selection rule may specify, for example, that message data 410 received by the data communication system 400 be differentiated into separate differential data queues 430 based on the message data 410 and/or the protocol header.

In certain embodiments, the queue selection rules 420 may be rules that differentiate the message data 410 into differential data queues 430. For example, the queue selection rules 420 may be set as either "on" or "off" based the "mode" selected by a user. As discussed above, the data communications system 400 may use rules and modes or profiles to perform throughput management functions such as optimizing available bandwidth, setting information priority, and managing data links in the network. The different modes may affecting changes in rules, modes, and/or data transports, for example. A mode or profile may include a set of rules related to the operational needs for a particular network state of health or condition. The data communication system 400 may provide dynamic reconfiguration of modes, including defining and switching to new modes "on-the-fly" or selection of a mode by a user, for example.

In certain embodiments, if the selected mode utilizes a set of queue selection rules 420, then the message data 410 may be analyzed to differentiate the message data 410 into differential data queues 430. In certain embodiments, the available modes may have different queue selection rules 420. For example, mode A may have a first set of queue selection rules 420 and mode B may have a second set of queue selection rules 420. A set of queue selection rules 420 may belong to a single mode, or a plurality of modes. A mode may have more than one set of queue selection rules 420.

In certain embodiments, functional redundancy rules may be used to search the differential data queues 430 to determine if a first message data set 410 from a source is stored in the differential data queues 430. If a first message data set 410 from the source is located, the redundancy rules may dictate the review of the time stamp of the first message data set 410. In certain embodiments, the redundancy rules may specify a comparison of the time stamp of the first message data set 410 with the time stamp of the second message data set 410. If the difference between the time stamp of the first data set and the time stamp of the second message data set 410 is not larger than a threshold level, a determination may be made that the first message data set 410 and the second message data set 410 are functionally redundant.

If a determination that the first data set and the second data sets are functionally redundant, the redundancy rules may drop the earlier first message data set 410 from the differential data queue 430. The redundancy rules may then add the later second message data set 410 to the differential data queue 430. In an embodiment, the redundancy rules may specify that the second message data set 410 to the differential data queue 430 such that the order of transmission of the differential data queue 430 is unchanged. Alternatively, the redundancy rules may specify to add the second message data set 410 to the differential data queue 430 in a first-in-first-out protocol. In such a manner, non-redundant pictorial data is sent to the destination without burdening the network with redundant pictorial data.

In certain embodiments, the message data 410 differentiated by the queue selection rules 420 are placed in the differential data queues 430 until the message data 410 is communicated. The differential data queues 430 are sized according to the user defined configuration of the data communication system 400. The configuration may specify the maximum amount of memory a differential data queue 430 can consume.

In certain embodiments, the data communication system 400 does not drop message data 410 when the data communication system 400 is notified by the network layer 460 of an outage (i.e., link failure). That is, although message data 410 may be low priority, it is not dropped by the data communication system 400. Rather, the message data 410 may be delayed for a period of time in the differential data queues 430 and/or secondary storage 440, potentially dependent on the amount of higher priority message data 410 that is received by the data communication system 400 that needs to be communicated and the amount of time of the link failure.

In certain embodiments, the data communication system 400 allows a user to specify the location and amount of secondary storage 440 that will be allowed for differential data queue 430 overflow. After the memory in the differential data queues 430 are completely filled, message data 410 may start being queued to secondary storage 440.

In certain embodiments, unless configured otherwise by a user, when the secondary storage 440 is exhausted, the queue selection rules 420 may remove the oldest message 410 in the differential data queue 430, log an error message, and queue the newest message 410. The error message may be logged on an application such as the Windows System Event Log, for example. The error message may contain information such as time of occurrence, for example. In certain embodiments, the log level and log path may be edited by a user while running, or by changing the value in the configuration file associated with the data communication system 400. In certain embodiments, the data communication system 400 may archive de-queued message data 410 with an indicator that it was not sent on the network.

In certain embodiments, memory for differential data queues 430 and secondary storage 440 are configured on a link basis for a specific application. The longer the outages (i.e., periods in which the physical link is failed), the more memory for the differential data queues 430 and secondary storage 440 will be required to support the outage. The data communication system 400 is easily integrated with network modeling and simulation applications to identify the ideal sizing to ensure that differential data queues 430 and secondary storage 440 are sized appropriately and the time between outages is sufficient to achieve steady-state and thereby avoid eventual differential data queue 430 and/or secondary storage 440 overflow.

In certain embodiments, user-defined queue sequencing rules 450 may organize and/or prioritize the message data 410 to be communicated. In certain embodiments, the queue sequencing rules 450 may determine a priority for a block of message data 410. For example, a block of message data 410 may be stored in a differential data queue 430 in the data communication system 400 and the queue sequencing rules 450, a prioritization component of the data communication system 400, may extract the block of message data 410 from the differential data queue 430 based on a priority determined for the block of message data 410 and/or for the queue 430. The priority of the block of message data 410 may be based at least in part on protocol information associated and/or included in the block of message data 410. In certain embodiments, the data communication system 400 is implemented as part of a protocol filter. The protocol information may be similar to the protocol information described above, for example. For example, the queue sequencing rules 450 may determine a priority for a block of message data 410 based on the source address of the block of message data 410. As another example, the queue sequencing rules algorithm 450 may determine a priority for a block of data based on the transport protocol used to communicate the block of message data 410.

The message data 410 may be prioritized based at least in part on one or more queue sequencing rules 450. As discussed above, the queue sequencing rules 450 may be user defined. In certain embodiments, the queue sequencing rules 450 may be written in XML, and/or provided via custom DLLs, for example. A queue sequencing rule 450 may specify, for example, that message data 410 being communicated using one protocol be favored over message data 410 utilizing another protocol. For example, command message data 410 may utilize a particular protocol that is given priority, via a queue sequencing rule 450, over position telemetry message data 410 sent using another protocol. As another example, a queue sequencing rule 450 may specify that position telemetry message data 410 sent to a first range of addresses may be given priority over position telemetry message data 410 sent to a second range of addresses. The first range of addresses may represent IP addresses of other aircraft in the same squadron as the aircraft with the data communication system 400 running on it, for example. The second range of addresses may then represent, for example, IP addresses for other aircraft that are in a different area of operations, and therefore of less interest to the aircraft on which the data communication system 400 is running.

In certain embodiments, queue sequencing rules 450 may map priority numbers to each message 410 in the system. A user-defined priority number may be an integer in the range from zero to the user-defined number of differential data queues 430. The priority number may correspond to the level of precedence the message 410 will have in the differential data queues 430. In certain embodiments, the highest number may have the highest level of priority. In certain embodiments, highest priority message data 410 is placed on the transport as it becomes available to the data communication system 400 while the lower priority numbered messages 410 may be forwarded with less frequency, depending on the user-defined queue sequencing rules 450.

The prioritization of the message data 410 by the queue sequencing rules 450 may be used to provide QoS, for example. For example, the queue sequencing rules 450 may determine a priority for message data 410 to be sent over a tactical data network. The priority may be based on the destination address of the message data 410, for example. For example, a destination IP address for the message data 410 to a radio of a member of the same platoon as the platoon the data communication system 400 belongs to may be given a higher priority than data being sent to a unit in a different division in a different area of operations. The queue sequencing rules 450 may determine which of a plurality of differential data queues 430 are assigned a specific priority for subsequent communication by the data communication system 400. For example, a differential data queue 430 holding higher priority message data 410 may be assigned a higher priority by the queue sequencing rules 450, and in turn, in determining what message data 410 to next communicate may look first to the higher priority queue.

In certain embodiments, the data communication system 400 is transparent to other applications. For example, the processing, organizing, prioritizing, and/or communicating performed by the data communication system 400 may be transparent to one or more other applications or data sources. For example, an application running on the same system as the data communication system 400 may be unaware of the prioritization of message data 410 performed by the data communication system 400.

In certain embodiments, the queue sequencing rules 450 may be rules that prioritize the message data 410. For example, the queue sequencing rules 450 may be set as either "on" or "off" based the "mode" selected by a user. As discussed above, the data communications system 400 may use rules and modes or profiles to perform throughput management functions such as optimizing available bandwidth, setting information priority, and managing data links in the network. The different modes may affecting changes in rules, modes, and/or data transports, for example. A mode or profile may include a set of rules related to the operational needs for a particular network state of health or condition. The data communication system 400 may provide dynamic reconfiguration of modes, including defining and switching to new modes "on-the-fly" or selection of a mode by a user, for example.

In an embodiment, if the selected mode utilizes a set of queue sequencing rules 450, then the message data 410 may be analyzed to determine the priority based on the queue sequencing rules 450. In an embodiment, the available modes may have different queue sequencing rules 450. For example, mode A may have a first set of queue sequencing rules 450 and mode B may have a second set of queue sequencing rules 450. A set of queue sequencing rules 450 may belong to a single mode, or a plurality of modes. A mode may have more than one set of queue sequencing rules 450.

Message data 410 is communicated from the data communication system 400. The message data 410 may be communicated to one or more destination nodes as described above, for example. The message data 410 may be communicated over one or more links as described above, for example. For example, the message data 410 may be communicated by the data communication system 400 over a tactical data network to a radio. As another example, message data 410 may be provided by the data communication system 400 to an application running on the same system by an inter-process communication mechanism.

As discussed above, the components, elements, and/or functionality of the data communication system 400 may be implemented alone or in combination in various forms in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

FIG. 5 illustrates a flow diagram for a method 500 for communicating data in accordance with an embodiment of the present invention. The method 500 includes the following steps, which will be described below in more detail. At step 510, message data 410 is received at the data communication system 400. At step 520, the message data 410 is organized and differentiated using queue selection rules 420 to determine the appropriate queue 430 for the message data 410. At step 530, queue sequencing rules 450 are applied to determine the next queue 430 to service. At step 540, if the physical link is not active, the data communication system 400 waits for the link to be restored. At step 550, if, or when, the physical link is active, the message data 410 is communicated. The method 500 is described with reference to elements of systems described above, but it should be understood that other implementations are possible. For example, instead of queues, the memory may be another type of structured memory such as, but not limited to, lists, graphs and trees, for example.

At step 510, message data 410 is received at the data communication system 400. The message data 410 may be received over one or more links, for example. The message data 410 may be provided and/or generated by one or more data sources, for example. For example, message data 410 may be received at the data communication system 400 from a radio over a tactical data network. As another example, message data 410 may be provided to the data communication system 400 by an application running on the same system by an inter-process communication mechanism. As discussed above, the message data 410 may be a block of message data 410, for example.

At step 520, the message data 410 is organized and/or differentiated using queue selection rules 420 to determine the appropriate queue 430 for the message data 410. In certain embodiments, the data communication system 400 may apply user-defined queue selection rules 420 to differentiate and/or organize message data 410 into differential data queues 430. The queue selection rules 420 may be written in XML and/or provided via custom DLLs, for example. A queue selection rule 420 may specify, for example, that message data 410 received by the data communication system 400 be differentiated into separate differential data queues 430 based on the message data 410 and/or the protocol header.

In certain embodiments, the queue selection rules 420 may be rules that differentiate the message data 410 into differential data queues 430. For example, the queue selection rules 420 may be set as either "on" or "off" based the "mode" selected by a user. As discussed above, the data communications system 400 may use rules and modes or profiles to perform throughput management functions such as optimizing available bandwidth, setting information priority, and managing data links in the network. The different modes may affecting changes in rules, modes, and/or data transports, for example. A mode or profile may include a set of rules related to the operational needs for a particular network state of health or condition. The data communication system 400 may provide dynamic reconfiguration of modes, including defining and switching to new modes "on-the-fly" or selection of a mode by a user, for example.

In certain embodiments, if the selected mode utilizes a set of queue selection rules 420, then the message data 410 may be analyzed to differentiate the message data 410 into differential data queues 430. In certain embodiments, the available modes may have different queue selection rules 420. For example, mode A may have a first set of queue selection rules 420 and mode B may have a second set of queue selection rules 420. A set of queue selection rules 420 may belong to a single mode, or a plurality of modes. A mode may have more than one set of queue selection rules 420.

In certain embodiments, functional redundancy rules may be used to search the differential data queues 430 to determine if a first message data set 410 from a source is stored in the differential data queues 430. If a first message data set 410 from the source is located, the redundancy rules may dictate the review of the time stamp of the first message data set 410. In certain embodiments, the redundancy rules may specify a comparison of the time stamp of the first message data set 410 with the time stamp of the second message data set 410. If the difference between the time stamp of the first data set and the time stamp of the second message data set 410 is not larger than a threshold level, a determination may be made that the first message data set 410 and the second message data set 410 are functionally redundant.

If a determination that the first data set and the second data sets are functionally redundant, the redundancy rules may drop the earlier first message data set 410 from the differential data queue 430. The redundancy rules may then add the later second message data set 410 to the differential data queue 430. In an embodiment, the redundancy rules may specify that the second message data set 410 to the differential data queue 430 such that the order of transmission of the differential data queue 430 is unchanged. Alternatively, the redundancy rules may specify to add the second message data set 410 to the differential data queue 430 in a first-in-first-out protocol. In such a manner, non-redundant pictorial data is sent to the destination without burdening the network with redundant pictorial data.

In certain embodiments, the message data 410 differentiated by the queue selection rules 420 are placed in the differential data queues 430 until the message data 410 is communicated. The differential data queues 430 are sized according to the user defined configuration of the data communication system 400. The configuration may specify the maximum amount of memory a differential data queue 430 can consume.

In certain embodiments, the data communication system 400 does not drop message data 410 when the data communication system 400 is notified by the network layer 460 of an outage (i.e., link failure). That is, although message data 410 may be low priority, it is not dropped by the data communication system 400. Rather, the message data 410 may be delayed for a period of time in the differential data queues 430 and/or secondary storage 440, potentially dependent on the amount of higher priority message data 410 that is received by the data communication system 400 that needs to be communicated and the amount of time of the link failure.

In certain embodiments, the data communication system 400 allows a user to specify the location and amount of secondary storage 440 that will be allowed for differential data queue 430 overflow. After the memory in the differential data queues 430 are completely filled, message data 410 may start being queued to secondary storage 440.

In certain embodiments, unless configured otherwise by a user, when the secondary storage 440 is exhausted, the queue selection rules 420 may remove the oldest message 410 in the differential data queue 430, log an error message, and queue the newest message 410. The error message may be logged on an application such as the Windows System Event Log, for example. The error message may contain information such as time of occurrence, for example. In certain embodiments, the log level and log path may be edited by a user while running, or by changing the value in the configuration file associated with the data communication system 400. In certain embodiments, the data communication system 400 may archive de-queued message data 410 with an indicator that it was not sent on the network.

In certain embodiments, memory for differential data queues 430 and secondary storage 440 are configured on a link basis for a specific application. The longer the outages (i.e., periods in which the physical link is failed), the more memory for the differential data queues 430 and secondary storage 440 will be required to support the outage. The data communication system 400 is easily integrated with network modeling and simulation applications to identify the ideal sizing to ensure that differential data queues 430 and secondary storage 440 are sized appropriately and the time between outages is sufficient to achieve steady-state and thereby avoid eventual differential data queue 430 and/or secondary storage 440 overflow.

At step 530, queue sequencing rules 450 are applied to determine the next queue in the differential data queues 430 to service. The message data 410 to be prioritized may be the message data 410 that is received at step 510, for example. In certain embodiments, user-defined queue sequencing rules 450 may organize and/or prioritize the message data 410 to be communicated. In certain embodiments, the queue sequencing rules 450 may determine a priority for a block of message data 410. For example, a block of message data 410 may be stored in a differential data queue 430 in the data communication system 400 and the queue sequencing rules 450, a prioritization component of the data communication system 400, may extract the block of message data 410 from the differential data queue 430 based on a priority determined for the block of message data 410 and/or for the queue 430. The priority of the block of message data 410 may be based at least in part on protocol information associated and/or included in the block of message data 410. In certain embodiments, the data communication system 400 is implemented as part of a protocol filter. The protocol information may be similar to the protocol information described above, for example. For example, the queue sequencing rules 450 may determine a priority for a block of message data 410 based on the source address of the block of message data 410. As another example, the queue sequencing rules algorithm 450 may determine a priority for a block of data based on the transport protocol used to communicate the block of message data 410.

The message data 410 may be prioritized based at least in part on one or more queue sequencing rules 450. As discussed above, the queue sequencing rules 450 may be user defined. In certain embodiments, the queue sequencing rules 450 may be written in XML and/or provided via custom DLLs, for example. A queue sequencing rule 450 may specify, for example, that message data 410 being communicated using one protocol be favored over message data 410 utilizing another protocol. For example, command message data 410 may utilize a particular protocol that is given priority, via a queue sequencing rule 450, over position telemetry message data 410 sent using another protocol. As another example, a queue sequencing rule 450 may specify that position telemetry message data 410 sent to a first range of addresses may be given priority over position telemetry message data 410 sent to a second range of addresses. The first range of addresses may represent IP addresses of other aircraft in the same squadron as the aircraft with the data communication system 400 running on it, for example. The second range of addresses may then represent, for example, IP addresses for other aircraft that are in a different area of operations, and therefore of less interest to the aircraft on which the data communication system 400 is running.

In certain embodiments, queue sequencing rules 450 may map priority numbers to each message 410 in the system. A user-defined priority number may be an integer in the range from zero to the user-defined number of differential data queues 430. The priority number may correspond to the level of precedence the message 410 will have in the differential data queues 430. In certain embodiments, the highest number may have the highest level of priority. In certain embodiments, highest priority message data 410 is placed on the transport as it becomes available to the data communication system 400 while the lower priority numbered messages 410 may be forwarded with less frequency, depending on the user-defined queue sequencing rules 450.

The prioritization of the message data 410 by the queue sequencing rules 450 may be used to provide QoS, for example. For example, the queue sequencing rules 450 may determine a priority for message data 410 to be sent over a tactical data network. The priority may be based on the destination address of the message data 410, for example. For example, a destination IP address for the message data 410 to a radio of a member of the same platoon as the platoon the data communication system 400 belongs to may be given a higher priority than data being sent to a unit in a different division in a different area of operations. The queue sequencing rules 450 may determine which of a plurality of differential data queues 430 are assigned a specific priority for subsequent communication by the data communication system 400. For example, a differential data queue 430 holding higher priority message data 410 may be assigned a higher priority by the queue sequencing rules 450, and in turn, in determining what message data 410 to next communicate may look first to the higher priority queue.

In certain embodiments, the data communication system 400 is transparent to other applications. For example, the processing, organizing, prioritizing, and/or communicating performed by the data communication system 400 may be transparent to one or more other applications or data sources. For example, an application running on the same system as the data communication system 400 may be unaware of the prioritization of message data 410 performed by the data communication system 400.

In certain embodiments, the queue sequencing rules 450 may be rules that prioritize the message data 410. For example, the queue sequencing rules 450 may be set as either "on" or "off" based on the "mode" selected by a user. As discussed above, the data communications system 400 may use rules and modes or profiles to perform throughput management functions such as optimizing available bandwidth, setting information priority, and managing data links in the network. The different modes may affecting changes in rules, modes, and/or data transports, for example. A mode or profile may include a set of rules related to the operational needs for a particular network state of health or condition. The data communication system 400 may provide dynamic reconfiguration of modes, including defining and switching to new modes "on-the-fly" or selection of a mode by a user, for example.

In an embodiment, if the selected mode utilizes a set of queue sequencing rules 450, then the message data 410 may be analyzed to determine the priority based on the queue sequencing rules 450. In an embodiment, the available modes may have different queue sequencing rules 450. For example, mode A may have a first set of queue sequencing rules 450 and mode B may have a second set of queue sequencing rules 450. A set of queue sequencing rules 450 may belong to a single mode, or a plurality of modes. A mode may have more than one set of queue sequencing rules 450.

At step 540, if the physical link is not active, the data communication system 400 waits for the link to be restored. Often tactical network links, such as those found in ad-hoc networks, are extremely fault prone. In these cases the transport may be available one moment, gone the next, and then back again some time later. For example, in some tactical networks a vehicle can only receive data when stationary and loses communications when on the move. In certain embodiments, the queue sequencing algorithm 450 is notified of the link failure. Once the link is restored, the queue sequencing algorithm 450 is notified that the link is restored.

At step 550, if, or when, the physical link is active, the message data 410 is communicated. The data communicated may be the data received at step 510, for example. The data communicated may be the data prioritized at step 520, for example. Data may be communicated from the data communication system 400, for example. The data may be communicated to one or more destination nodes, for example. The data may be communicated over one or more links, for example. For example, the data may be communicated by the data communication system 400 over a tactical data network to a radio. As another example, data may be provided by the data communication system 400 to an application running on the same system by an inter-process communication mechanism.

One or more of the steps of the method 500 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Thus, certain embodiments of the present invention provide systems and methods that provide a QoS mechanism that is tolerant of an unreliable physical layer. Certain embodiments provide a technical effect of a QoS mechanism that is tolerant of an unreliable physical layer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for fault-tolerant quality of service (QoS) data communication, the method including:
performing by at least one processing device:
differentiating at least one message data into a primary storage, wherein the at least one message data is differentiated based on at least one queue selection rule;
storing the differentiated at least one message data in a secondary storage if the primary storage becomes exhausted;
removing the oldest at least one message data to make room for the newest at least one message data when the primary storage and the secondary storage are exhausted;
logging an error message for tracking removed at least one message data;
prioritizing the at least one message data, wherein the at least one message data is prioritized based on at least one queue sequencing rule; and
communicating the at least one message data based at least in part on the prioritization of the at least one message data,
wherein at least the steps of differentiating, storing and prioritizing occur between the transport layer and the session layer in the Open Systems Interconnection (OSI) seven layer protocol model.

2. The method of claim 1, wherein the prioritizing and communicating steps ceases when notified of a failed link.

3. The method of claim 2, wherein the prioritizing and communicating steps resume when notified that the failed link is restored.

4. The method of claim 1, wherein the communicating step includes transmitting the message data at least in part over a tactical data network.

5. The method of claim 1, wherein at least one of:
the primary storage, and
the secondary storage is at least one queue.

6. The method of claim 1, wherein at least one of:
the queue selection rules, and
the queue sequencing rules is user-defined.

7. The method of claim 1, wherein the at least one of:
the queue selection rules, and
the queue sequencing rules is determined by a user-defined mode.

8. The method of claim 1, wherein the prioritizing step is transparent to an application program.

9. A system for fault-tolerant quality of service (QoS) data communication, the system including:
a differentiation component, the differentiation component operable to differentiate at least one message data using at least one queue selection rule;
a primary storage component, the primary storage component operable to store the differentiated at least one message data;
a secondary storage component, the secondary storage component operable to store the at least one message data if the primary storage component becomes exhausted;
a removal component, the removal component operable to remove the oldest at least one message data to make room for the newest at least one message data when the primary storage component and the secondary storage component are exhausted;
a recording component, the recording component operable to log an error message for tracking removed at least one message data;
a prioritization component, the prioritization component operable to prioritize the at least one message data using at least one queue sequencing rule, wherein the system for data communication operates between the transport layer and the session layer in the Open Systems Interconnection (OSI) seven layer protocol model.

10. The system of claim 9, wherein at least one of:
the at least one queue selection rule, and
the at least one queue sequencing rule is user-defined.

11. The system of claim 9, wherein at least one of:
the primary storage component, and
the secondary storage component is sized and located according to user-defined configuration.

12. The system of claim 9, wherein at least one of:
the primary storage component, and
the secondary storage component is at least one queue.

13. The system of claim 9, further including archive storage for storing the at least one message data removed from at least one of:
the primary storage component, and
the secondary storage component when the primary storage component and the secondary storage component are exhausted.

14. The system of claim 9, wherein the at least one queue sequencing rule prioritizes the at least one message data based at least in part on protocol.

15. The system of claim 9, wherein the at least one queue selection rule and the at least one queue sequencing rule are written in at least one of:
Extensible Markup Language (XML), and
custom Dynamic Link Library (DLL).

16. A non-transitory computer-readable medium including a set of instructions for execution on a computer, the set of instructions including:
a differentiation routine, the differentiation routine configured to differentiate at least one message data into at least one queue of a primary storage using at least one queue selection rule;
a storage routine, the storage routine configured to store the differentiated at least one message data in a secondary storage if the primary storage becomes exhausted;
a prioritization routine, the prioritization routine configured to determine a priority for the at least one message data using at least one queue sequencing rule; and
a communication routine, the communication routine configured to communicate the at least one message data based at least in part on the prioritization routine;
a recordation routine, the recordation routine configured to log an error message for tracking at least one message data that is removed before reaching the communication routine,
wherein at least the differentiation routine, the storage routine and the prioritization routine occur between the transport layer and the session layer in the Open Systems Interconnection (OSI) seven layer protocol model.

\* \* \* \* \*